(12) United States Patent
Morinaga

(10) Patent No.: US 9,590,430 B2
(45) Date of Patent: Mar. 7, 2017

(54) TERMINAL DEVICE, CONTROL DEVICE, CHARGE AND DISCHARGE CONTROL SYSTEM, CHARGE AND DISCHARGE CONTROL ADJUSTMENT METHOD, CHARGE AND DISCHARGE CONTROL METHOD, AND PROGRAM THEREOF

(71) Applicant: Tsuyoshi Morinaga, Tokyo (JP)

(72) Inventor: Tsuyoshi Morinaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 510 days.

(21) Appl. No.: 13/854,193

(22) Filed: Apr. 1, 2013

(65) Prior Publication Data

US 2013/0257357 A1 Oct. 3, 2013

(30) Foreign Application Priority Data

Mar. 30, 2012 (JP) ................................ 2012-078520

(51) Int. Cl.
*H02J 7/00* (2006.01)
*H02J 7/14* (2006.01)
*B60L 11/18* (2006.01)

(52) U.S. Cl.
CPC ......... *H02J 7/0004* (2013.01); *B60L 11/1824* (2013.01); *H02J 7/0042* (2013.01); *H02J 7/0047* (2013.01); *H02J 7/0068* (2013.01); *Y02T 10/7005* (2013.01); *Y02T 10/7072* (2013.01); *Y02T 90/12* (2013.01); *Y02T 90/121* (2013.01); *Y02T 90/14* (2013.01); *Y02T 90/16* (2013.01)

(58) Field of Classification Search
USPC ......... 320/107, 109, 101, 134, 132; 307/119
See application file for complete search history.

(56) References Cited

U.S. PATENT DOCUMENTS

| 2004/0017181 A1* | 1/2004 | Sakai | H02J 9/002 320/132 |
|---|---|---|---|
| 2010/0289446 A1* | 11/2010 | Jang | H01M 10/465 320/101 |
| 2011/0095623 A1* | 4/2011 | Doh | B60L 3/0046 307/119 |
| 2011/0133687 A1* | 6/2011 | Kim | H04M 1/21 320/101 |

FOREIGN PATENT DOCUMENTS

| JP | 2002-90152 A | 3/2002 |
|---|---|---|
| JP | 2006-74867 A | 3/2006 |
| JP | 2007-531158 A | 11/2007 |
| JP | 2009-516280 A | 4/2009 |
| JP | 2010-4620 A | 1/2010 |
| JP | 2011-024293 A | 2/2011 |

OTHER PUBLICATIONS

Japanese Office Action for JP Application No. 2012-078520 mailed on Feb. 25, 2014 with English Translation.

\* cited by examiner

*Primary Examiner* — Alexis A Boateng

(57) ABSTRACT

A terminal device includes: a tilt sensor that detects a tilt; a communication unit that transmits a signal according to the tilt detected by the tilt sensor; and a display unit that displays a status of charging performed according to the tilt detected by the tilt sensor.

3 Claims, 19 Drawing Sheets

TERMINAL DEVICE, CONTROL DEVICE, CHARGE AND DISCHARGE CONTROL SYSTEM, CHARGE AND DISCHARGE CONTROL ADJUSTMENT METHOD, CHARGE AND DISCHARGE CONTROL METHOD, AND PROGRAM THEREOF

This application is based upon and claims the benefit of priority from Japanese patent application No. 2012-78520, filed on Mar. 30, 2012, the disclosure of which is incorporated herein in its entirety by reference.

BACKGROUND OF THE INVENTION

Field of the Invention

The present invention relates to a terminal device, a control device, a charge and discharge control system, a charge and discharge control adjustment method, a charge and discharge control method, and a program thereof.

Description of Related Art

There have been proposed several methods of controlling charging of a secondary battery such as a secondary battery that is mounted on an electric motor vehicle. For example, Japanese Unexamined Patent Application, First Publication No. 2011-24293 (hereunder, referred to as Patent Document 1) discloses a charging system for a vehicle including a center server. This charging system for a vehicle, in a case where an authentication is established with the center server, allows a charger with an authenticating function to charge an on-vehicle battery. Meanwhile, this charging system prescribes the number of allowed non-authenticated charges that is the number of charges allowed to be performed on the on-vehicle battery from a charger with no authenticating function. With this configuration, charging of an on-vehicle battery from a charger with no authenticating function is restricted.

As a result, the charging system for a vehicle has a higher level of security while having a higher level of versatility.

However, the method of setting charge/discharge to be performed by a user (that instructs charging or discharging) at the time of artificially performing charging or recharging has not been sufficiently developed.

For example, Patent Document 1 shows a technique for deciding whether or not charging is allowed. However, there is not shown a method of setting a charge amount when the electric vehicle user requests charging for the electric vehicle. This electric vehicle user needs to perform an operation according to the operating method defined, for example, at each electric power station to thereby set a charging amount. Performing this operation places a burden on a user that is not familiar with the operation, and also charging may not be correctly performed as a result of incorrect operation.

SUMMARY OF THE INVENTION

An exemplary object of the present invention is to provide a terminal device, a control device, a charge and discharge control system, a charge and discharge control adjustment method, a charge and discharge control method, and a program thereof that are capable of solving the above problems.

A terminal device according to an exemplary aspect of the present invention includes: a tilt sensor that detects a tilt; a communication unit that transmits a signal according to the tilt detected by the tilt sensor; and a display unit that displays a status of charging performed according to the tilt detected by the tilt sensor.

A control device according to an exemplary aspect of the present invention includes: a receiver that receives a signal according to a tilt of a terminal device; and a charge and discharge controller that controls charging of a charge target from a power supply. The charge and discharge controller switches execution and stop of control of the charging of the charge target from the power supply, based on the signal according to the tilt of the terminal device received by the receiver.

A charge and discharge control system according to an exemplary aspect of the present invention, includes a control device and a terminal device. The terminal device includes: a tilt sensor that detects a tilt; a communication unit that transmits a signal according to the tilt detected by the tilt sensor; and a display unit that displays a status of charging performed according to the tilt detected by the tilt sensor. The control device includes: a receiver that receives the signal according to the tilt of the terminal device; and a charge and discharge controller that controls charging of a charge target from a power supply. The charge and discharge controller switches execution and stop of control of the charging of the charge target from the power supply, based on the signal according to the tilt of the terminal device received by the receiver.

A charge and discharge control adjustment method according to an exemplary aspect of the present invention is for a terminal including a tilt sensor that detects a tilt. The method includes: transmitting a signal according to the tilt detected by the tilt sensor; and displaying a status of charging performed according to the tilt detected by the tilt sensor.

A charge and discharge control method according to an exemplary aspect of the present invention is for a control device. The method includes: receiving a signal according to a tilt of a terminal device; and controlling charging of a charge target from a power supply. The controlling the charging includes switching execution and stop of control of the charging of the charge target from the power supply, based on the received signal according to the tilt of the terminal device.

A program according to an exemplary aspect of the present invention causes a terminal device including a tilt sensor detecting a tilt to execute: transmitting a signal according to the tilt detected by the tilt sensor; and displaying a status of charging performed according to the tilt detected by the tilt sensor.

A program according to an exemplary aspect of the present invention causes a computer serving as a control device to execute: receiving a signal according to a tilt of a terminal device; and controlling charging of a charge target from a power supply, the controlling the charging including switching execution and stop of control of the charging of the charge target from the power supply, based on the received signal according to the tilt of the terminal device.

According to an embodiment of the present invention, a person that instructs charging or discharging is able to easily perform charging or discharging without the need for learning the method for operating charging and discharging that is defined for each device.

EXEMPLARY EMBODIMENT

Figure 1:
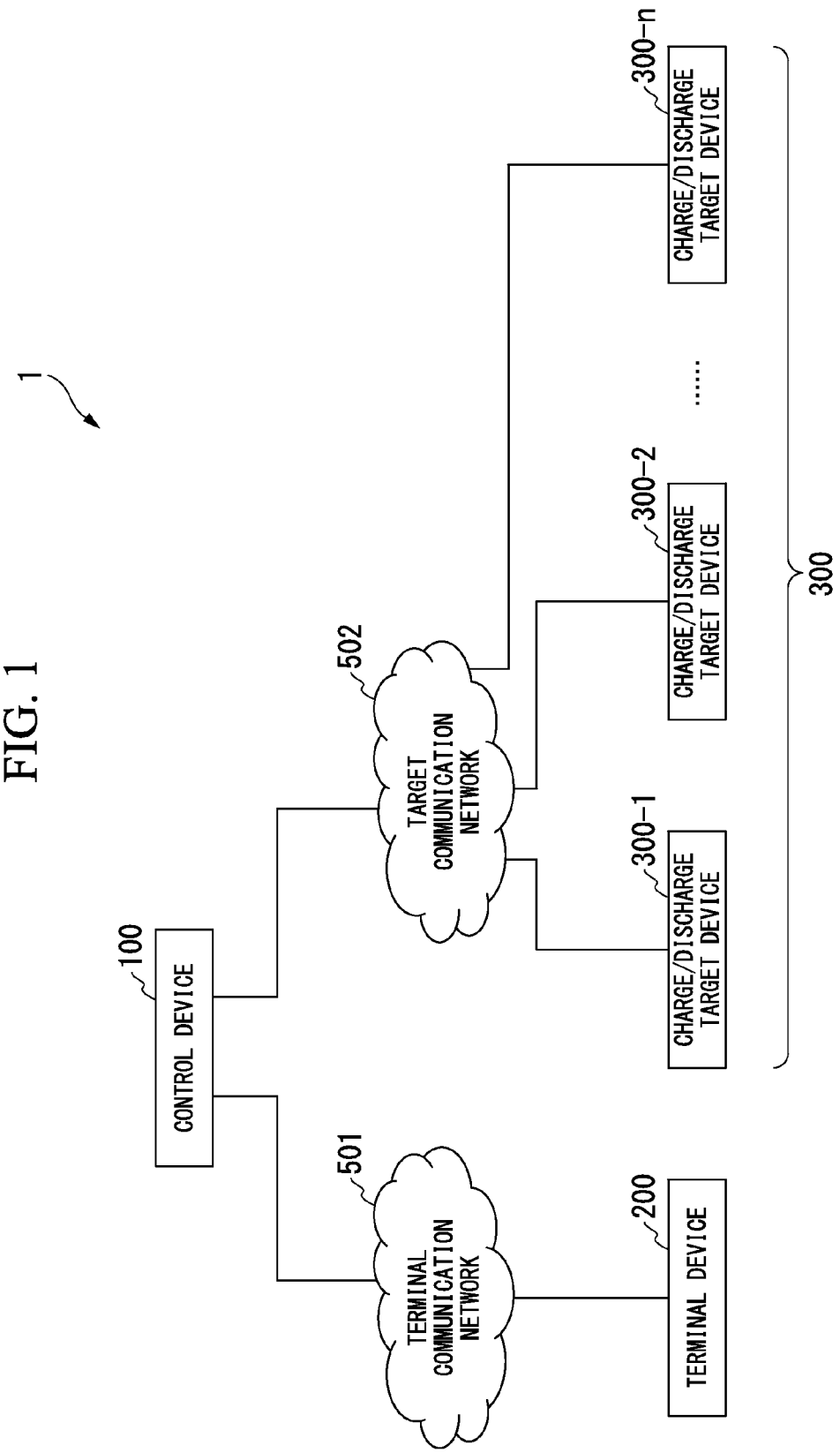
FIG. 1 is a schematic block diagram showing a functional configuration of a charge/discharge control system according to an exemplary embodiment of the present invention.

Hereunder, an exemplary embodiment of the present invention is described, with reference to the drawings. FIG. 1 is a schematic block diagram showing a functional configuration of a charge/discharge (charge and discharge) control system according to the exemplary embodiment of the present invention. In FIG. 1, a charge/discharge control system 1 includes a control device 100 and a terminal device 200. The control device 100 is connected to the terminal device 200 via a terminal communication network 501. The control device 100 is also connected to charge/discharge (charge and discharge) target devices 300-1 to 300-n via a target communication network 502.

Hereinafter, the charge/discharge target devices 300-1 to 300-n are collectively referred to as "charge/discharge target devices 300".

The terminal communication network 501 may be a communication network which includes a mobile phone communication network (a communication network provided by a telecommunications carrier for mobile phones). The terminal communication network 501 intermediates wireless communications between the terminal device 200 and the control device 100. The configuration of the above terminal communication network 501 is an example, and various types of communication networks may be used as the terminal communication network 501.

For example, the terminal communication network 501 may be of a wireless communication network dedicated for communications between the control device 100 and the terminal device 200. Alternatively, the terminal communication network 501 may be of a wired network. For example, the terminal device 200, by being connected via a USB cable to a computer that is connected to the terminal communication network 501, may be connected to the terminal communication network 501 via the computer.

The target communication network 502 may be the Internet. The target communication network 502 intermediates communications between the control device 100 and the charge/discharge target devices 300. The configuration of the above target communication network 502 is an example, and various types of communication networks may be used as the target communication network 502. For example, the terminal communication network 501 may be of a network dedicated for communications between the control device 100 and the charge/discharge target devices 300. Moreover, the target communication network 502 may be of a wired communication network or a wireless communication network such as a mobile phone communication network.

The terminal communication network 501 and the target communication network 502 may be the same network. For example, the terminal communication network 501 and the target communication network 502 may both be realized by the Internet.

The charge/discharge target devices 300-1 to 300-n include a secondary battery. The charge/discharge target devices 300-1 to 300-n perform discharging from the secondary battery (supply or output electric power), or perform charging of the secondary battery (obtain or input electric power).

Figure 2:
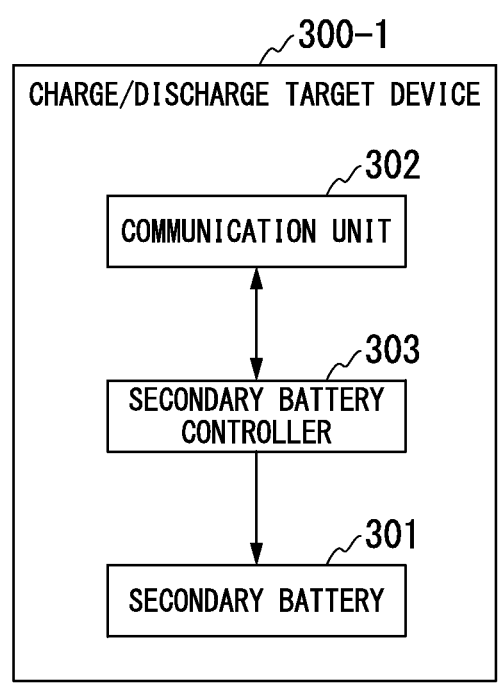
FIG. 2 is a schematic block diagram showing a functional configuration of a charge/discharge target device according to the present exemplary embodiment.

FIG. 2 is a schematic block diagram showing a functional configuration of a charge/discharge target device 300-1. In FIG. 2, the charge/discharge target device 300-1 includes a secondary battery 301, a communication unit 302, and a secondary battery controller 303.

The secondary battery 301 may be a battery which can be charged such as a lead battery and a lithium ion battery. The secondary battery 301 follows control of the secondary battery controller 303 to supply electric power to the outside of the charge/discharge target device 300-1 and accumulate electric power supplied from the outside of the charge/discharge target device 300-1.

The communication unit 302 connects to the target communication network 502 to perform communications with the control device 100. The communication unit 302 outputs received data from the control device 100 to the secondary battery controller 303, and it transmits transmitted data supplied from the secondary battery controller 303 to the control device 100.

In particular, the communication unit 302 receives instructions (control information) related to control of the secondary battery 301 such as charge instruction and discharge instruction from the control device 100, and supplies them to the secondary battery controller 303. Moreover, the communication unit 302 transmits, to the control device 100, status information of the secondary battery 301, which is obtained and output by the secondary battery controller 303.

The secondary battery controller 303 controls the secondary battery 301. In particular, the secondary battery controller 303 controls charging and discharging of the secondary battery 301 according to the control information that the communication unit 302 has received.

The secondary battery controller 303 obtains (measures or calculates) status information of the secondary battery 301 such as charging rate (state of charge: SOC) of the secondary battery 301. The secondary battery controller 303 transmits, via the communication unit 302 and the target communication network 502 to the control device 100, the obtained status information.

The functional configurations of the charge/discharge target devices 300-2 to 300-$n$ are also similar to that of the charge/discharge target device 300-1.

The charge/discharge target device 300 is not limited to one that has the functional configuration shown in FIG. 2. Various types of devices that perform at least either electric power output or electric power acquisition may serve as the charge/discharge target devices 300. Moreover, the charge/discharge target device 300 is not limited to a single device, and it may be of a system including a plurality of devices. For example, the charge/discharge target device 300 may be a power generating plant such as thermal power plant or wind power plant, and it may also be an electric power system in which a plurality of power generating plants are connected.

The charge/discharge target device 300 includes a device with which a user of the charge/discharge control system 1 can decide whether or not to perform charging/discharging of the charge/discharge target device 300 (hereunder, described as "can be disposed" by this user). For example, the charge/discharge target device 300 may include an electric motor vehicle in possession of the user of the charge/discharge control system 1, or a home-stationary type rechargeable battery system installed at the home of the user. The user may control charging of, for example, the electric motor vehicle in possession of the user, using the charge/discharge control system 1.

Hereunder, the charge/discharge target device 300 that is set to supply electric power is referred to as "power supply". Meanwhile, the charge/discharge target device 300 that is set to obtain electric power is referred to as "charge target".

The charge/discharge control system 1 performs control of supplying/receiving of electric power to be performed between the charge/discharge target devices 300 (for example, control of charging and discharging).

The control device 100 transmits control information to the charge/discharge target devices 300 based on the information supplied from the terminal device 200, and performs supplying and receiving of electric power between the change/discharge target devices 300. The control device 100 may be realized with a computer such as a server device for example.

Figure 3:
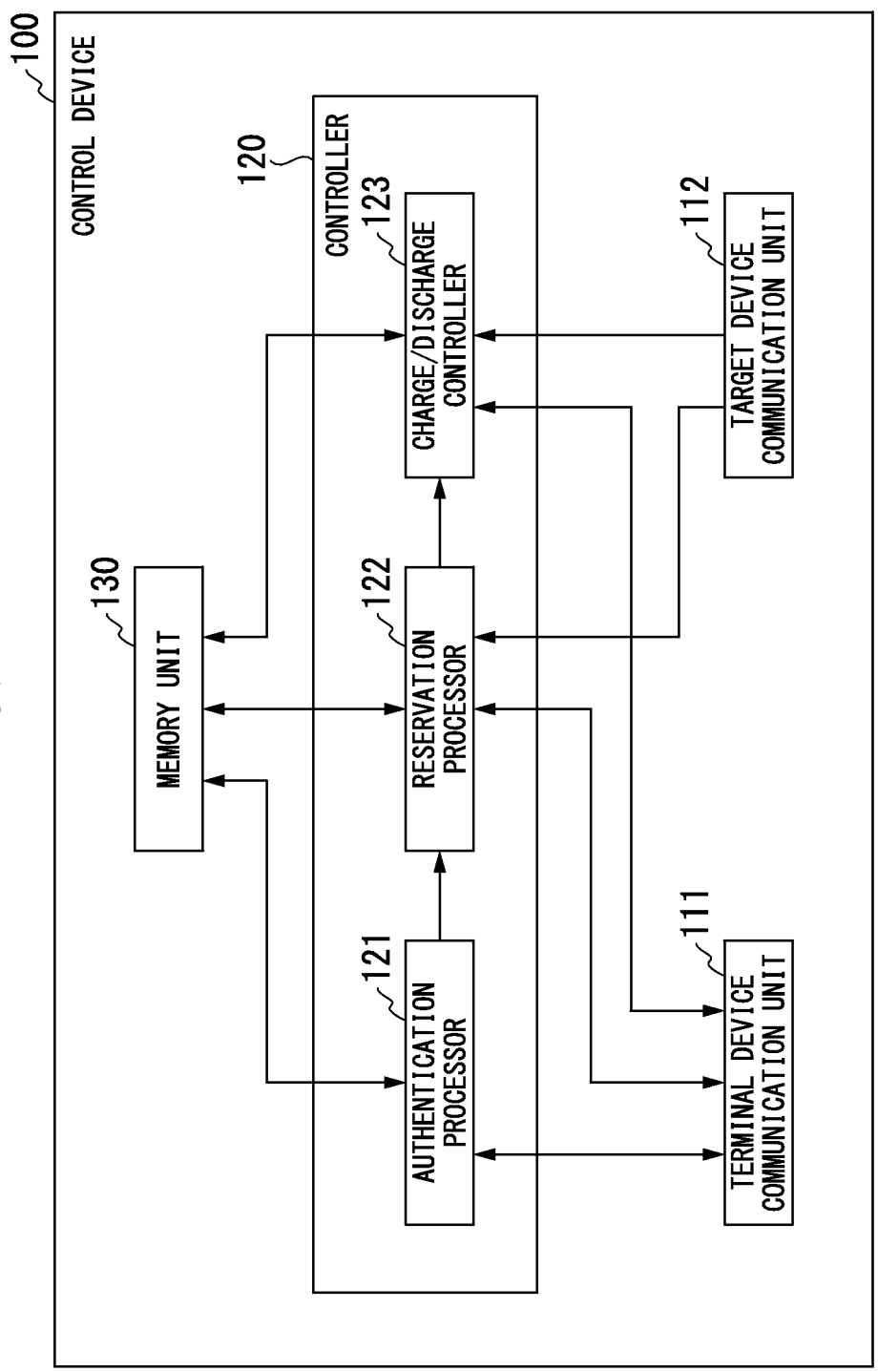
FIG. 3 is a schematic block diagram showing a functional configuration of a charge/discharge target device according to the present exemplary embodiment.

FIG. 3 is a schematic block diagram showing a functional configuration of the control device 100. In FIG. 3, the control device 100 includes a terminal device communication unit (receiver) 111, a target device communication unit 112, a controller 120, and a memory unit 130. The controller 120 includes an authentication processor 121, a reservation processor 122, and a charge/discharge (charge and discharge) controller 123.

The terminal device communication unit 111 connects to the terminal communication network 501 to perform communications with the terminal device 200. The terminal device communication unit 111 supplies the controller 120 with received data from the terminal device 200. Moreover, the terminal device communication unit 111 transmits, to the terminal device 200, transmitted data supplied from the controller 120. In particular, the terminal device communication unit 111 receives information transmitted from the terminal device 200 that indicates the tilt (posture) of the terminal device 200 itself, and the terminal device communication unit 111 outputs the received information to the controller 120.

The target device communication unit 112 connects to the target communication network 502 to perform communications with the charge/discharge target device 300. The target device communication unit 112 then provides the controller 120 with received data from the charge/discharge target device 300. Moreover, the target device communication unit 112 transmits, to the charge/discharge target device 300, transmitted data supplied from the controller 120. In particular, the target device communication unit 112 transmits, to the appropriate charge/discharge target device 300, instructions (control information) which is generated and output by the controller 120. The instructions are related to the control of the charge/discharge target device 300 (secondary battery 301) such as a charging instruction and a discharging instruction to the charge/discharge target device 300. Moreover, the target device communication unit 112 receives the status information of the secondary battery 301 transmitted from the charge/discharge target device 300, and outputs it to the controller 120.

The controller 120 may be, for example, realized in a manner such that a CPU (central processing unit) included in the controller 120 reads a program from the memory unit 130, executes it, and controls respective parts of the control device 100 to execute various types of functions.

The authentication processor 121 processes authentication (user authentication) with respect to the terminal device 200. With the authentication processor 121 performing authentication processing, unauthorized access of the terminal device 200 to the control device 100 can be suppressed, and thereby, unauthorized use of electric power (unauthorized power receiving from the power supply) can be suppressed.

The reservation processor 122 processes reservation of electric power supply to the charge target from the power supply according to a reservation request from the terminal device 200.

The charge/discharge controller 123 performs control of supplying and receiving of electric power to be performed between the charge/discharge target devices 300. More specifically, the charge/discharge controller 123 controls charging to be performed for charge targets from the power supply. For example, the charge/discharge controller 123 switches execution and stop of the control for charging to be performed for the charge target from the power supply, based on the information that indicates the tilt of the terminal device 200 received by the terminal device communication unit 111. Accordingly, the user of the charge/discharge control system 1 can adjust the aspect of charging being performed on the charge target from the power supply (for example, the charge amount), with an operation of tilting the terminal device 200.

The memory unit 130 may be, for example, realized in a manner such that a memory region of a memory device such as a semiconductor memory which is included in the control device 100 memorizes various types of data. For example, the memory unit 130 may memorize the program to be executed by the CPU included in the controller 120, and authentication data of the terminal device 200.

The terminal device 200 may be a smart phone in possession of the user of the charge/discharge control system 1. The terminal device 200 functions as a terminal device of the control device 100. However, the terminal device 200 is not limited to being a smart phone. As the terminal device 200, various types of device which are capable of communicating with the control device 100 while being capable of detecting a tilt of the device main body may be used. For example, the terminal device 200 may be of a mobile phone, a mobile information terminal device (personal data assistant: PDA), or a gaming machine, and the terminal device 200 may be of a device dedicated for the terminal of the control device 100.

Figure 4:
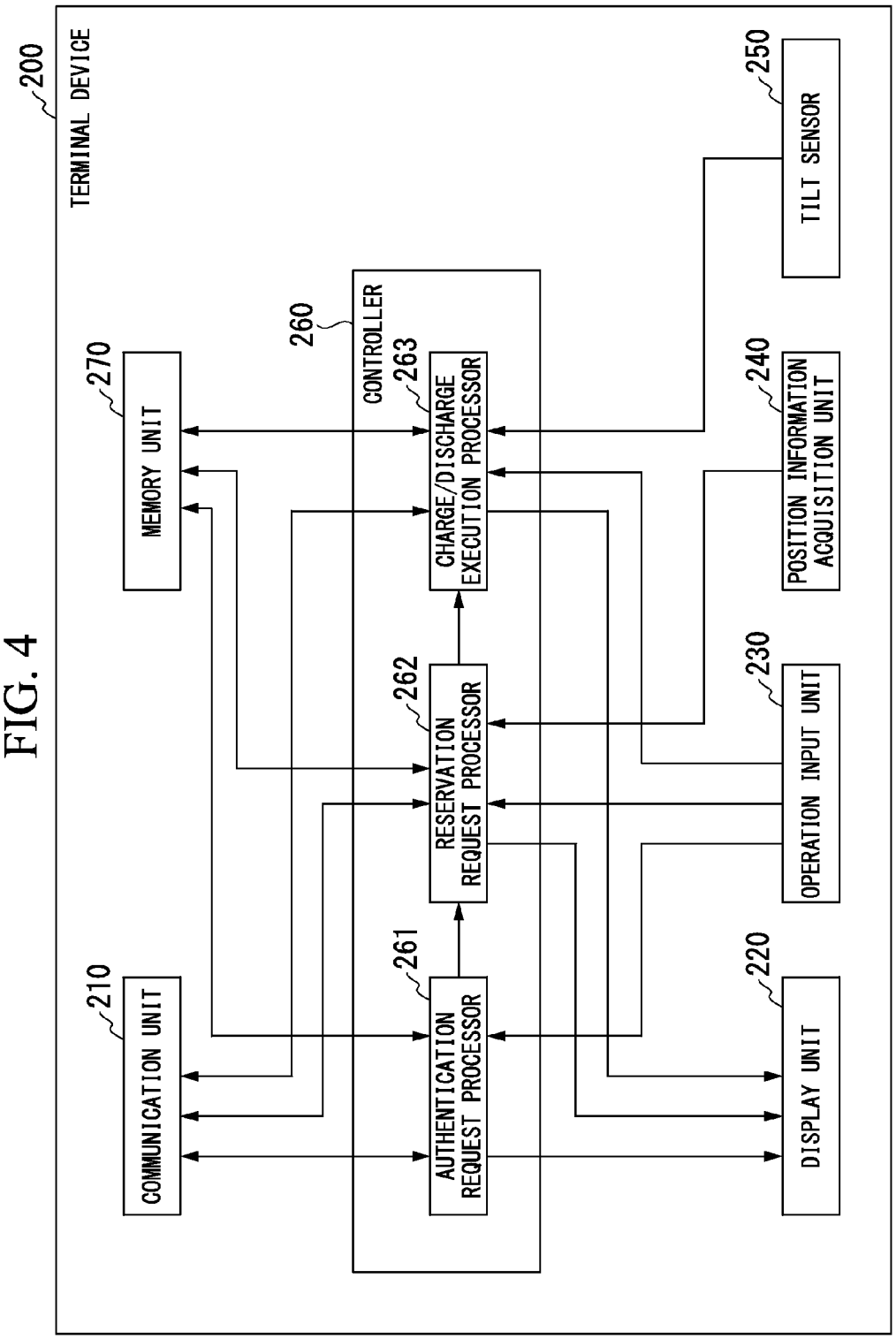
FIG. 4 is a schematic block diagram showing a functional configuration of a terminal device according to the present exemplary embodiment.

FIG. 4 is a schematic block diagram showing a functional configuration of the terminal device 200. In FIG. 4, the terminal device 200 includes a communication unit 210, a display unit 220, an operation input unit 230, a position information acquisition unit 240, a tilt sensor 250, a controller 260, and a memory unit 270. The controller 260 includes an authentication request processor 261, a reservation request processor 262, and a charge/discharge (charge and discharge) execution processor 263.

The communication unit 210 connects to the terminal communication network 501 to perform communications with the control device 100. The communication unit 210 provides the controller 260 with received data from the control device 100. Moreover, the communication unit 210 transmits, to the control device 100, transmitted data provided from the controller 260.

In particular, the communication unit 210 transmits a signal according to the tilt detected by the tilt sensor 250. This signal is used as a signal to have the control device 100 to perform control of supplying/receiving electric power between the charge/discharge target devices 300.

Specifically, the communication unit 210 transmits a charge execution request as a signal according to the tilt when the tilt sensor 250 detects the tilt.

For example, the communication unit 210 transmits a charge execution request including information that indicates the magnitude of the tilt detected by the tilt sensor 250 and it receives information indicating a charging speed that is determined according to the magnitude of the tilt (for example, information indicating charging electric power (electric power supply made to the charge target from the power supply)).

Furthermore, for example, the communication unit 210 transmits a charge execution request when the tilt sensor 250 detects a tilt being made in a direction of rotating the display screen along the display screen of the display unit 220. Accordingly, with an easy operation of tilting the terminal device 200 along the display screen of the display unit 220 (tilting the terminal device 200 in the left rotational direction or in the right rotational direction from a state of holding it where the display screen of the display unit 220 is facing the user), the user of the charge/discharge control system 1 can have supplying and receiving of electric power to be performed between the charge/discharge target devices 300.

When the operation input unit 230 detects that an operation has been performed to request the charging status to be maintained (a charging status lock operation), the communication unit 210 transmits a signal for maintaining the charging status, according to the request. Here, "charging status" refers to some kind of status in electric power supply to a charge target from the power supply, and it is an object to be maintained when a charging status lock operation is operated. As this charging status, various statuses may be used. For example, a charging status can be: a distinction between charging being performed and not being performed (whether charging is being performed); a charging speed (for example, charging electric power); an amount of time required for charging; a charging amount; or a combination of several of these.

Hereunder, maintaining the charging status is referred to as "charging status lock".

For example, in a case where the operation input unit 230 detects that an operation has been performed for requesting the charging status to be maintained, then, even if the tilt of the terminal device 200 changes, the communication unit 210 continues to transmit a signal indicating the tilt at the time of the request. In this manner, with a charging status lock operation received on the terminal device 200, the user of the charge/discharge control system 1 can have charging to be performed until the charge target goes into a fully-charged status, without the need for maintaining the tilt of the terminal device 200. Accordingly, even in a case where a prolonged period of time is required before the charge target is brought into the fully charged status for example, the user of the charge/discharge control system 1 does not need to maintain the tilt of the terminal device 200.

Moreover, when the tilt sensor 250 detects that the orientation of the display screen of the display unit 220 has become level, the communication unit 210 transmits a signal for maintaining the charging status. Accordingly, the user of the charge/discharge control system 1 can perform the charging status lock operation with an easy operation of tilting the display screen of the display unit 220 to the horizontal orientation (laying down the display screen from the state of holding it where the display screen of the display unit 220 is standing (perpendicularly)). Furthermore, the user of the charge/discharge control system 1 can have the charging state lock to continue by leaving the communication unit 210 to rest on a desk or the like while the posture thereof is maintained in a way such that the orientation of the display screen is horizontal.

Hereunder, the state where the display screen of the display unit 220 is oriented horizontal is referred to as "horizontal state".

The communication unit 210 transmits information that indicates a power supply selected from power supply candidates. The control device 100 controls electric power supply from the selected power supply to the charge target.

The communication unit 210 transmits position information (position information of the terminal device 200) acquired by the position information acquisition unit 240, and it receives information that indicates power supply candidates according to the position of the terminal device 200. The communication unit 210 receives the power supply candidates, and the display unit 220 displays the power supply candidates. With this configuration, the user of the charge/discharge control system 1 can select a power supply from the power supply candidates.

The display unit 220 may have a display screen such as a liquid crystal display. The display unit 220 may display various types of images including dynamic images, static images, and text (characters). In particular, the display unit 220 displays the status of charging performed according to the tilt detected by the tilt sensor 250 (charging status described above). For example, the display unit 220 may display, as the state of charging, that charging is being performed. Furthermore, for example, the display unit 220 may display an image of a tilted container as an indication of charging being performed.

Moreover, for example, the display unit 220 may display, in addition to the display of charging being performed as the state of charging, charging speed (for example, charging electric power).

The display unit 220 displays candidates of charge targets that are to receive charging. With the display unit 220 displaying the charge target candidates, the user of the charge/discharge control system 1 can select a charge target from the charge target candidates. The communication unit 210 transmits, to the control device 100, information that indicates the charge target selected from the charge target candidates.

The display unit 220 displays candidates of charging power supplies. For example, the display unit 220 may display power supply candidates based on the information indicating the power supply candidates that is received by the communication unit 210. As described above, with the display unit 220 displaying the power supply candidates, the user of the charge/discharge control system 1 can select a power supply from the power supply candidates.

The operation input unit 230 has input devices such as a push button or a touch panel (touch sensor) provided on the display screen of the display unit 220. The operation input unit 230 receives operations (user operations) performed by the user of the charge/discharge control system 1 (the user of the terminal device 200). In particular, the operation input unit 230 receives an operation of requesting the charging status to be maintained (charging status lock operation). The operation input unit 230 supplies the controller 260 with information that indicates the received user operation.

The position information acquisition unit 240 may have a GPS (global positioning system) receiver for example. The position information acquisition unit 240 acquires position information of the terminal device 200. The position information acquisition unit 240 supplies the acquired position information with the controller 260.

The mechanism of the position acquisition unit 240 for acquiring position information of the terminal device 200 is not limited to the mechanism that uses GPS. For example, the position information acquisition unit 240 may extract information that indicates the position of the terminal device 200 (for example, identification information of a mobile phone base station device), from the signal received by the communication unit 210 from the mobile phone base station device.

The tilt sensor 250 may be, for example, realized in a manner such that an axial acceleration sensor detects a tilt of the terminal device 200. In particular, the tilt sensor 250 detects a tilt of the direction along the display screen of the display unit 220. For example, the tilt sensor 250 may detect a tilt when the user of the charge/discharge control system 1 rotates the terminal device 200 to the left or right from the state of holding it where the display screen of the display unit 220 is facing the user.

The tilt sensor 250 detects that (the display screen of) the terminal device 200 has become horizontal. For example, the tilt sensor 250 may detect that the user of the charge/discharge control system 1 has placed the communication unit 210 on a table or the like. The tilt sensor 250 supplies the controller 260 with information that indicates the detected tilt.

The controller 260 may be, for example, realized in a manner such that a CPU (central processing unit) included in the controller 260 reads a program from the memory unit 270, executes it, and controls respective parts of the control device 260 to execute various types of functions.

The authentication request processor 261 performs an authentication request with respect to the control device 100. As described above, with the authentication processor 121 processing authentication according to the authentication request from the authentication request processor 261, unauthorized access of the terminal device 200 to the control device 100 is suppressed. With this configuration, unauthorized use of electric power can be suppressed.

The reservation request processor 262 requests a reservation of electric power supply from a power supply to a charge target.

According to the tilt of the terminal device 200 detected by the tilt sensor 250, or the user operation received by the operation input unit 230, the charge/discharge execution processor 263 requests the control device 100 to execute electric power supply from a power supply to a charge target, and displays on the display unit 220 the status of electric power supply being executed.

The memory unit 270 may be, for example, realized in a manner such that a memory region of a memory device such as a semiconductor memory included in the terminal device 200 memorizes various types of data. For example, the memory unit 270 may memorize the program to be executed by the CPU included in the controller 260, and authentication data for performing an authentication request with respect to the terminal device 100.

The number of terminal devices 200 to be included in the charge/discharge control system 1 is not limited to one as shown in FIG. 1, and the number may be one or more. For example, several users may be able to use the charge/discharge control system 1 (that is to say, there may be several users of the charge/discharge control system 1), and each of the users may posses a terminal device 200. A single user may posses two or more terminal devices 200.

Next, operations of the charge/discharge system 1 are described, with reference to FIG. 5 to FIG. 13.

Figure 5:
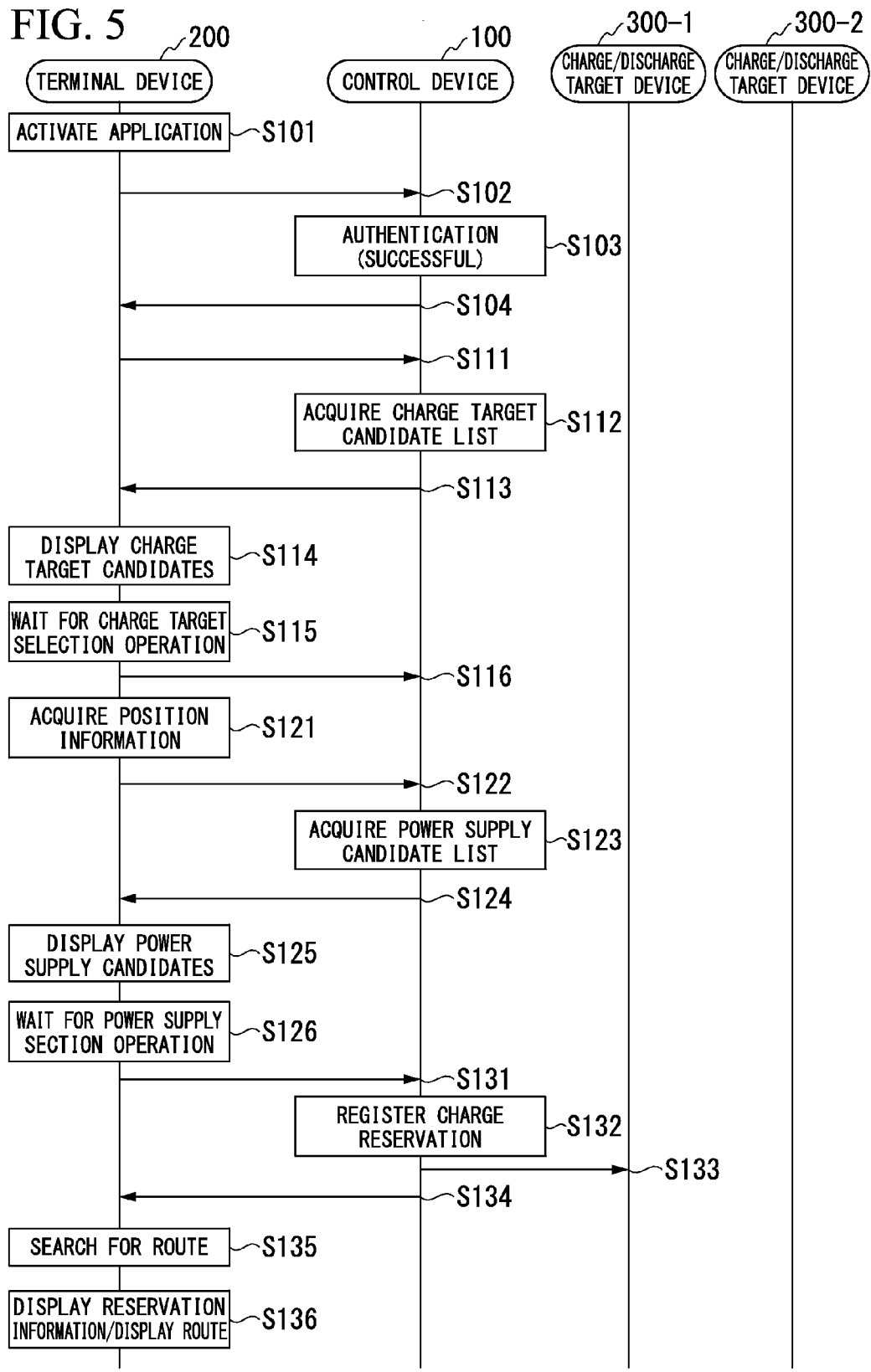
FIG. 5 is a sequence diagram showing an operation example in a case where the charge/discharge control system performs reservation of electric power supply to a charge target from a power supply in the present exemplary embodiment.

FIG. 5 is a sequence diagram showing an operation example in a case where the charge/discharge control system 1 performs reservation of electric power supply to a charge target (charge/discharge target device 300-2) from a power supply (charge/discharge target device 300-1). First, the CPU of the terminal device 200 activates a charge/discharge control application according to a user operation (sequence S101). This charge/discharge control application is (an application program including) a function of controlling electric power supply from a power supply to a charge target via the control device 100.

Figure 6:
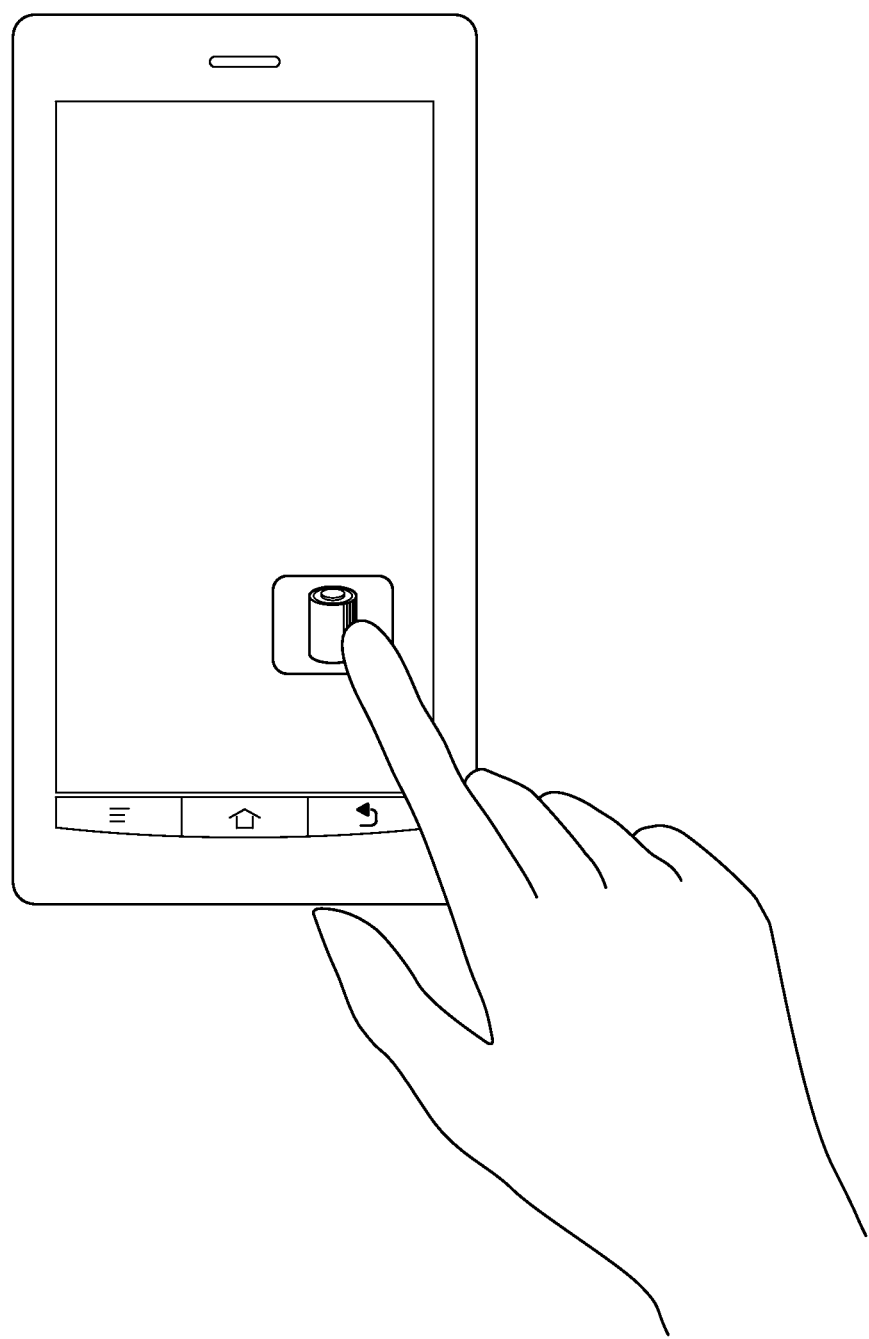
FIG. 6 is an explanatory diagram showing an example of a user operation for activating a charge/discharge control application in the present exemplary embodiment.

FIG. 6 is an explanatory diagram showing an example of a user operation for activating the charge/discharge control application. As shown in FIG. 6, for example, the user of the charge/discharge control system 1 touches, on the display screen of the display unit 220, a predetermined icon that is set as an icon for activating the charge/discharge control application. With this process, the charge/discharge control application is activated. By activating the charge/discharge control application (that is, with the CPU of the terminal device 200 executing the charge/discharge control application), the respective parts of the controller 260 are realized.

Next, the terminal device 200 transmits an authentication request to the control device 100 (sequence S102). For example, the operation input unit 230 may receive a password input operation of the user, and the authentication request processor 261 may transmit, to the control device 100 via the communication unit 210 and the terminal communication network 501, the user authentication request that includes a password.

Having received the authentication request from the terminal device 200, the control device 100 performs authentication of the authentication request (sequence S103). For example, the terminal device communication unit 111 may receive the authentication request and may output it to the authentication processor 121. The authentication processor 121 may read the password from the authentication request received by the terminal device communication unit 111, and may perform a password authentication, in which the read password is compared with the password memorized in the memory unit 130.

In the example shown in FIG. 5, the authentication processor 121 succeeds in the authentication, and transmits the authentication result that indicates an authentication success to the terminal device 200 (sequence S104).

Having received the authentication result, the terminal device 200 transmits to the control device 100 a transmission request for a charge target candidate list (sequence S111). Hereunder, a candidate of a charge target is referred to as "charge target candidate", and a list of charge target candidates is referred to as "charge target candidate list". Specifically, the communication unit 210 receives the authentication result, and outputs it to the authentication request processor 261. The authentication request processor 261 has the reservation request processor 262 to inherit the process, based on the authentication result. The reservation request processor 262 transmits, to the control device 100, a transmission request for a charge target candidate list via the memory unit 270 and the terminal communication network 501.

Figure 7:
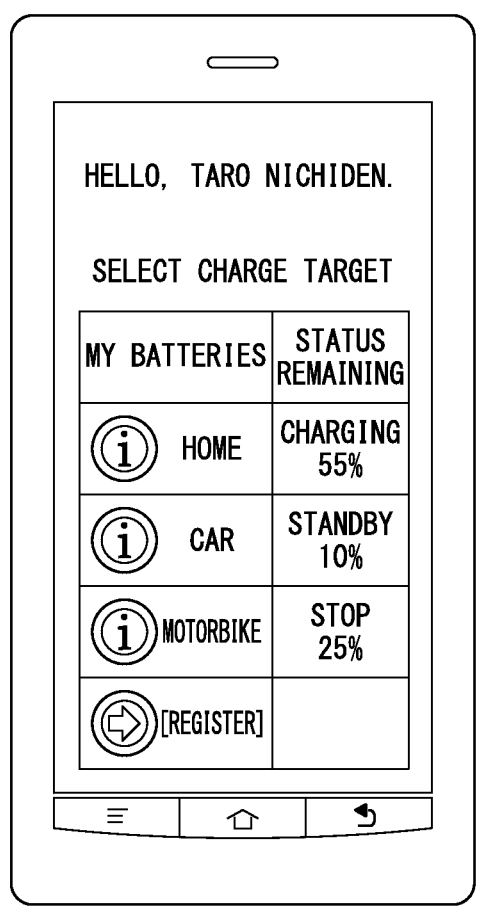
FIG. 7 is an explanatory diagram showing an example of displaying charge target candidates in the present exemplary embodiment.

FIG. 7 is an explanatory diagram showing an example of displaying charge target candidates. As shown in FIG. 7, the terminal device 200 displays the charge target candidates, and the user of the charge/discharge control system 1 (the user of the terminal device 200) can select any one of the candidates (touch one on the screen, for example) to thereby specify a charge target.

In order to display these charge target candidates, the terminal device 200 requests the control device 100 to provide a charge target candidate list that indicates charge target candidates that are preliminarily registered by the user of the charge/discharge control system 1.

In the present exemplary embodiment, the control device 100 transmits (replies) to the terminal device 200 the charge target candidate list that includes attendant information such as charging status and charging rate (remaining capacity), and the terminal device 200 displays this attendant information together with the names of the charge target candidates. With the terminal device 200 displaying the attendant information, the user of the charge/discharge control system 1 can determine whether or not charging is required by making reference to the attendant information.

In this manner, the control device 100 acquires a charge target candidate list according to the transmission request for the charge target candidate list from the terminal device 200 (sequence S112).

For example, the control device 100 may receive registration of charge target candidates for each user of the charge/discharge control system 1, and the memory unit 130 may preliminarily memorize them. When the terminal device communication unit 111 receives the transmission request for the charge target candidate list, the reservation processor 122 reads user information from the transmission request, and reads from the memory unit 130 charge target candidates for the corresponding user (the user of the charge/discharge control system 1). Furthermore, concerning the respective read charge target candidates, the reservation processor 122 acquires status information such as charging rate (for example, it reads the status information from the charge target candidates), and generates a charge target candidate list.

The control device 100 transmits the acquired charge target candidate list to the terminal device 200 (sequence S113). Specifically, the reservation processor 122 transmits, to the terminal device 200 via the terminal device communication unit 111 and the terminal communication network 501, the charge target candidate list that has been acquired in sequence S112.

Having received the charge target candidate list from the control device 100, the terminal device 200 displays the charge target candidates as illustrated in the example shown in FIG. 7 (sequence S114). Specifically, the communication unit 210 receives the charge target candidate list and outputs it to the reservation request processor 262, and the reservation request processor 262, based on the charge target candidate list, generates display image data of the charge target candidates and outputs the data to the display unit 220. The display unit 220 displays the charge target candidates based on the display image data from the reservation request processor 262.

The terminal device 200 may receive registration of charge target candidates and preliminarily memorize the charge target candidates (before the user of the charge/discharge control system 1 operates to select a charge target). For example, in the charge target candidate registration mode of the charge/discharge control application, the operation input unit 230 may receive an operation of registering charge target candidates and output it to the reservation request processor 262. The reservation request processor 262 may register (write) information of these charge target candidates (for example, names, identification information, and so forth) into the memory unit 270.

With the terminal device 200 pre-memorizing charge target candidates, communications between the terminal device 200 and the control device 100 can be reduced.

On the other hand, with the control device 100 pre-memorizing charge target candidates, charge target candidates and candidates of power supplies (hereunder, referred to as "power candidates") can be managed in a unified manner. For example, a home-stationary type rechargeable battery installed at the home the user of the charge/discharge control system 1 may become a charge target, while it may also become a power supply when charging an electric motor vehicle in possession of this user. As described above, about the charge/discharge target devices 300 that can become a charge target candidate and also a power supply candidate, with the control device 100 uniformly managing the information of these charge/discharge target devices 300, it is possible for the user of the charge/discharge control system 1 to save the effort of doubly registering. Moreover, the control device 100 does not need to doubly memorize the information of these charge/discharge target devices 300, and the memory capacity can be reduced.

The terminal device 200 displaying the charge target candidates waits for an operation of charge target selection (sequence S115). Specifically, when the operation input unit 230 detects an operation of charge target selection (for example, a touch operation on the display screen of the display unit 220), it outputs information that indicates the detected operation to the reservation request processor 262. The reservation request processor 262 identifies the selected charge target based on the information from the operation input unit 230.

In this example, the user of the charge/discharge control system 1 selects "car" (electric motor vehicle) as a charge target among the charge targets shown in FIG. 7. This "car" is the same as the charge/discharge target device 300-2.

Next, the terminal device 200 transmits the result of the charge target selection to the control device 100 (sequence S116). Specifically, as the result of the charge target selection, the reservation request processor 262 transmits the identification information of the selected charge target to the control device 100 via the communication unit 210 and the terminal communication network 501.

The terminal device 200 acquires the position information of the terminal device 200 itself (sequence S121). The terminal device 200 adds the acquired position information in the transmission request for a power supply candidate list, and transmits the request including the acquired position information to the control device 100 (sequence S122). Hereunder, the candidates of power supply are referred to as "power supply candidates", and the list of power supply candidates is referred to as "power supply candidate list". Specifically, first, the position information acquisition unit 240 acquires the position information of the terminal device 200, and outputs it to the reservation request processor 262. The reservation request processor 262 generates a transmission request for a power supply candidate list, and transmits it to the control device 100 via the communication unit 210 and the terminal communication network 501. At this time, the reservation request processor 262 adds the position information of the terminal device 200 in the transmission request for the power supply candidate list.

Figure 8:
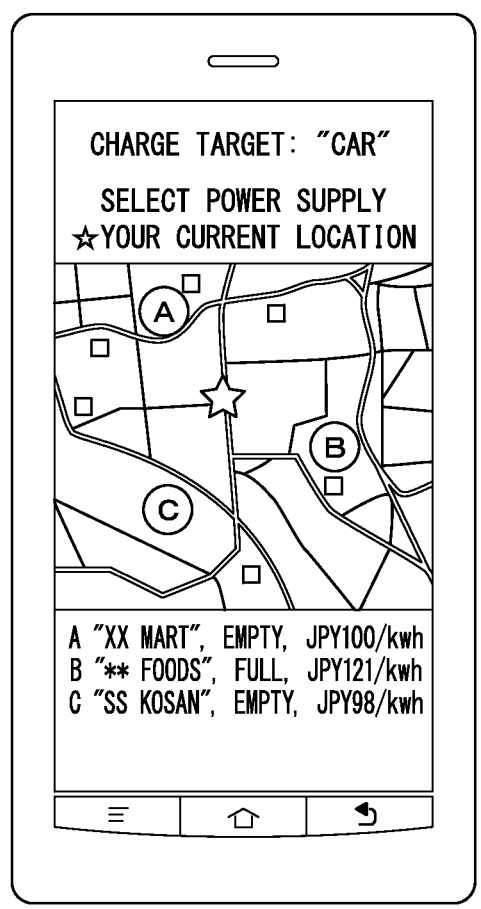
FIG. 8 is an explanatory diagram showing an example of displaying power supply candidates in the present exemplary embodiment.

FIG. 8 is an explanatory diagram showing an example of displaying charge target candidates. As shown in FIG. 8, the terminal device 200 displays the power supply candidates, and the user of the charge/discharge control system 1 (the user of the terminal device 200) selects any one of the candidates (touch one on the screen, for example) to thereby specify a power supply.

In order to display these power supply candidates, the terminal device 200 requests the control device 100 to provide a power supply candidate list that indicates power supply candidates according to the position of the terminal device 200 (for example, power supply candidates positioned within a certain distance from the position of the terminal device 200).

In the present exemplary embodiment, the control device 100 transmits (replies) to the terminal device 200 the power supply candidate list that includes attendant information such as positions of the power supply candidates and unit cost of electric power. The terminal device 200 displays the power supply candidates on a map based on the position information of the power supply candidates, and it also displays the unit price of electric power accompanying therewith. With the terminal device 200 displaying power supply candidates on a map, the user of the charge/discharge control system 1 can select a power supply to which the user can easily access from their current position. Moreover, with the terminal device 200 displaying the unit cost of electric power, the user can select a more inexpensive power supply.

In this manner, the control device 100 acquires a power supply candidate list according to the transmission request for the power supply candidate list from the terminal device 200 (sequence S123).

For example, the reservation processor 122 selects, among pre-registered power supply candidates (ones that are memorized in the memory unit 130), a power supply candidates that can be used by the user of the charge/discharge control system 1 (the user of the terminal device 200), and that are positioned within a certain distance from the position of the terminal device 200. Here, the reservation processor 122 selects power supply candidates, the usage right of which is given to the user, and specification of which such as voltage and capacity conforms with the charge target, as power supply candidates available for the user of the terminal device 200 to use.

The reservation processor 122 reads, for the respective selected power supply candidates, information of the power supply candidates (for example, name, position information, and unit cost information) from the memory unit 130, and generates a power supply candidate list.

The control device 100 transmits the acquired power supply candidate list to the terminal device 200 (sequence S124). Specifically, the reservation processor 122 transmits, to the terminal device 200 via the terminal device communication unit 111 and the terminal communication network 501, the power supply candidate list that has been acquired in sequence S123.

Having received the power supply candidate list from the control device 100, the terminal device 200 displays the power supply candidates as illustrated in the example shown in FIG. 8 (sequence S125). Specifically, the communication unit 210 receives the power supply candidate list, and outputs it to the reservation request processor 262. Moreover, the reservation request processor 262 acquires peripheral map data of the current position of the terminal device 200 based on the position information of the terminal device 200 acquired by the position information acquisition unit 240. Based on the acquired map data and the power supply candidate list, the reservation request processor 262 generates display image data of the power supply candidates and outputs it to the display unit 220. The display unit 220 displays the power supply candidates based on the display image data from the reservation request processor 262.

The terminal device 200 displaying the power supply candidates waits for an operation of power supply selection (sequence S126). Specifically, when the operation input unit 230 detects an operation of power supply selection (for example, a touch operation on the display screen of the display unit 220), it outputs information that indicates the detected operation to the reservation request processor 262. The reservation request processor 262 identifies the selected power supply based on the information from the operation input unit 230.

In this example, the user of the charge/discharge control system 1 selects, as a power supply, an electric power station named "SS Kosan" among the power supply candidates shown in FIG. 8. This "SS Kosan" is the same as the charge/discharge target device 300-1.

Next, the terminal device 200 transmits, to the control device 100, a charge reservation request for requesting a reservation of charging the charge target selected in the sequence S115 from the power supply selected in sequence S126 (sequence S131). Specifically, the reservation request processor 262 generates a charge reservation request that includes power supply identification information and charge target identification information, and transmits it to the control device 100 via the communication unit 210 and the terminal communication network 501.

This charge reservation request is a request for securing a power supply as a dedicated power supply for the charge target for a certain period of time. By securing a power supply, the user of the charge/discharge control system 1 can start charging immediately after arriving at the position of the power supply.

Having received the charge reservation request, the control device 100 registers a charge reservation based on the charge reservation request (sequence S132). Specifically, the terminal device communication unit 111 receives the charge reservation request, and outputs it to the reservation processor 122. The reservation processor 122 registers (stores) power supply reservation information into the memory unit 130. This power supply reservation information includes the identification information of the power supply and the identification information of the charge target, and is information indicating that a power supply has been reserved (secured) for supplying electric power to the charge target.

Moreover, the control device 100 transmits a control signal for suppressing electric power output to the charge/discharge target device 300-1, which is a power supply (sequence S133). For example, the reservation processor 122 may forbid the charge/discharge target device 300-1 to supply electric power until an electric power supply instruction from the control device 100 is received, and it may generate control information for having a charge/discharge target device 300-1 display "reserved" on its display screen. The reservation processor 122 transmits the generated control information via the target device communication unit 112 and the target communication network 502 to the charge/discharge target device 300-1.

Then, the control device 100 (reservation processor 122) transmits a reservation completion notification to the terminal device 200 (sequence S134).

In a case where the charge target is a device that travels to receive charging such as an electric motor vehicle, the terminal device 200, which has received the reservation completion notification, searches for a route to the power supply (sequence S135). Specifically, the communication unit 210 receives the reservation completion notification and outputs it to the reservation request processor 262, and the reservation request processor 262 searches for a route to the power supply from the current position of the terminal device 200 detected by the position information acquisition unit 240.

The terminal device 200 displays the reservation information and the route to the power supply (sequence S136). Specifically, the reservation request processor 262 extracts the reservation information from the reservation completion notification received from the control device 100, and generates image data that indicates the reservation information. Moreover, the reservation request processor 262 generates image data that indicates the route search result on the peripheral map data of the terminal device 200. The reservation request processor 262 combines the generated reservation information image data with the image data showing the route search result to generate display image data, and outputs it to the display unit 220. The display unit 220 displays the reservation information and the route search result based on the display image data from the reservation request processor 262.

Figure 9:
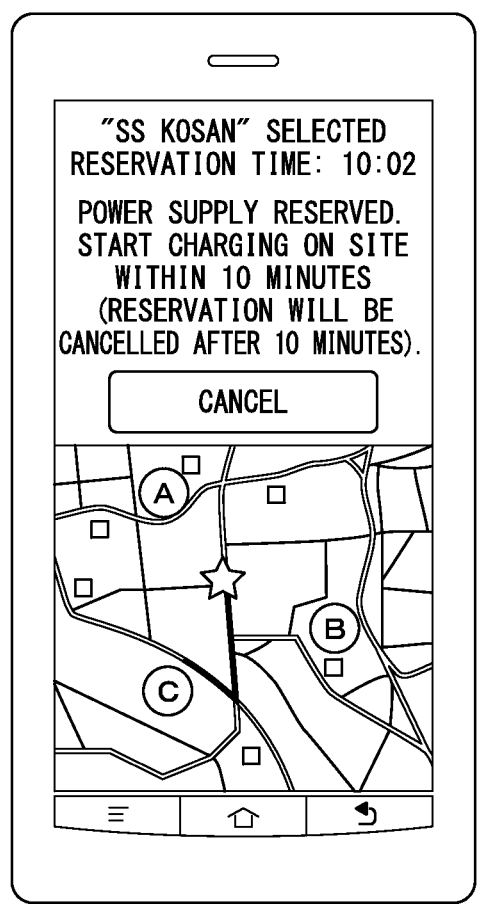
FIG. 9 is an explanatory diagram showing an example of displaying reservation information and route search results in the present exemplary embodiment.

FIG. 9 is an explanatory diagram showing an example of displaying reservation information and route search results.

As shown in FIG. 9, the terminal device 200 displays the name of the power supply and the route search result. With this configuration, the user of the charge/discharge control system 1 can confirm the reserved power supply, and travel to the position of the power supply. Moreover, the terminal device 200 displays a reservation period (in the example of FIG. 8, the reservation time, and the length of time to cancellation). With this configuration, the user of the charge/discharge control system 1 can avoid such a situation where the reservation period has elapsed and charging cannot be performed.

In a case where the charge target is a fixed device such as stationary type rechargeable battery, the terminal device 200 does not perform route search, and it displays reservation information. If a state where charging is possible is detected, the terminal device 200 proceeds to a charge execution process described next.

When a charge reservation has been performed, the user of the charge/discharge control system 1 makes reference to the route search result that the terminal device 200 displays, and travels to the electric power station, which is the position of the power supply. Having arrived at the position of the power supply, the user of the charge/discharge control system 1 connects the electric motor vehicle, which is the charge target, to the electric power station, which is the power supply. When the power supply and the charge target are connected, the charge/discharge control system 1 performs the charge execution process shown in FIG. 6.

Figure 10:
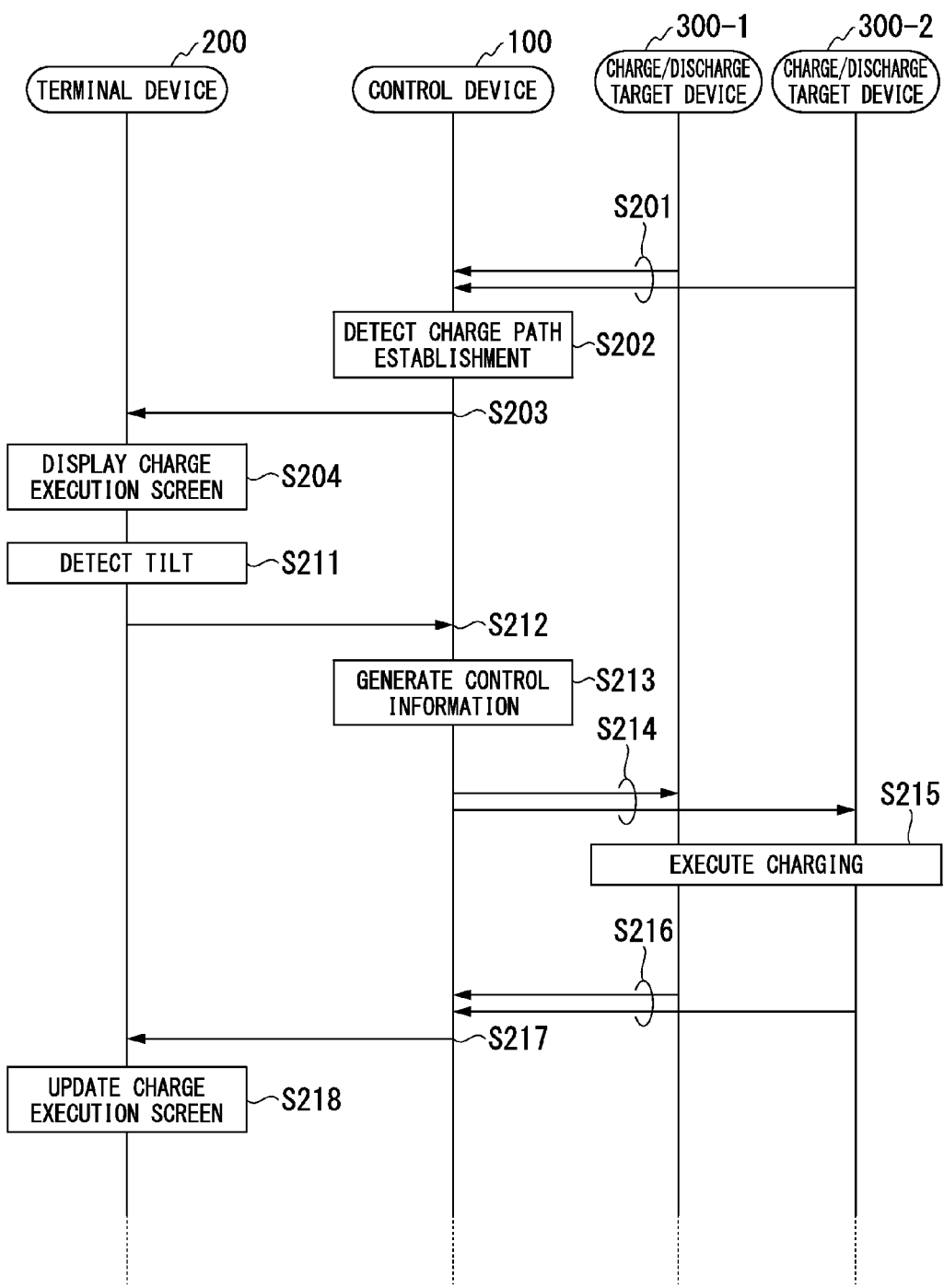
FIG. 10 is a sequence diagram showing an operation example in a case where the charge/discharge control system controls electric power supply to a charge target from a power supply in the present exemplary embodiment.

FIG. 10 is a sequence diagram showing an operation example in a case where the charge/discharge control system 1 controls supply of electric power to the charge/discharge target device 300-2 from the charge/discharge target device 300-1.

Having registered the charge reservation in sequence S134 of FIG. 5, the control device 100 receives status information on a regular basis from the charge/discharge target device 300-1, which is the power supply, and the charge/discharge target device 300-2, which is the charge target.

When the charge/discharge target device 300-1 and the charge/discharge target device 300-2 are connected, the control device 100 receives the status information that indicates that this connection has been performed (sequence S201). The control device 100 detects that a charge path has been established, based on the status information (sequence S202). The control device 100 transmits to the terminal device 200, a charge path establishment notification indicating that the charge path has been established (sequence S203).

Specifically, the target device communication unit 112 receives, from the charge/discharge target device 300-1 or the charge/discharge target device 300-2, or from both of them, the status information indicating that the charge/discharge target device 300-1 and the charge/discharge target device 300-2 have been connected. The target device communication unit 112 supplies the received status information to the charge/discharge controller 123. Based on the status information, the charge/discharge controller 123 detects that the charge path from the charge/discharge target device 300-1 to the charge/discharge target device 300-2 has been established, and generates a charge path establishment notification. The charge/discharge controller 123 transmits the generated charge path establishment notification via the terminal device communication unit 111 and the terminal communication network 501 to the terminal device 200.

Having received the charge path establishment notification, the terminal device 200 displays the initial screen of the charge execution screen (sequence S204).

Figure 11:
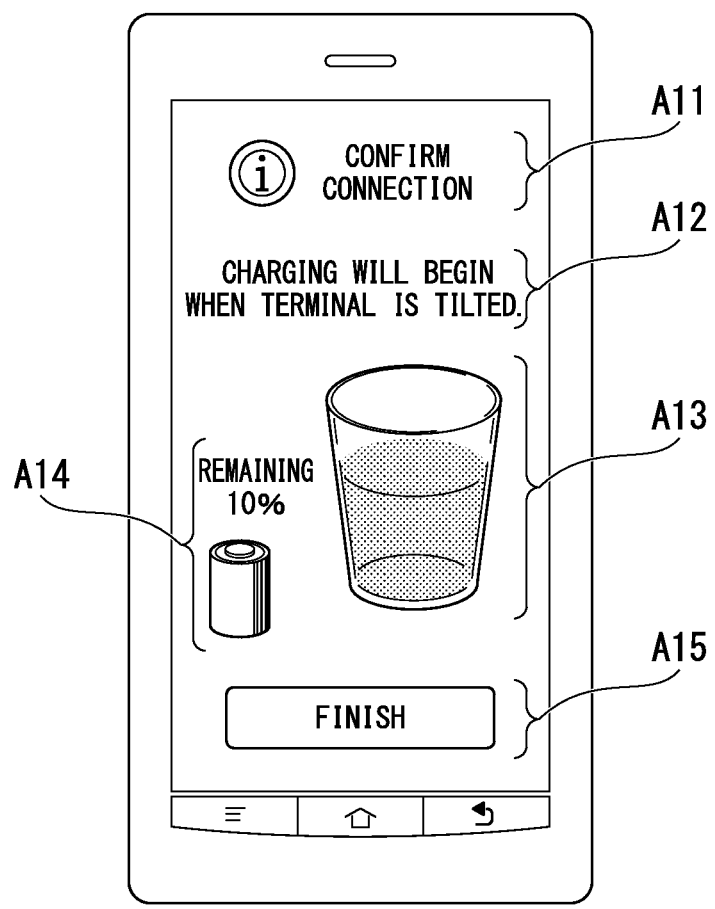
FIG. 11 is an explanatory diagram showing an example of displaying an initial screen of a charge execution screen in the present exemplary embodiment.

FIG. 11 is an explanatory diagram showing an example of displaying the initial screen of the charge execution screen. In FIG. 11, the charge execution screen has a charge execution status display region A11, a message display region A12, a charging status display region A13, a charging rate display region A14, and an operation region A15.

The charge execution status display region A11 is a region where the execution status of charging such as charge being executed is displayed. In the example of FIG. 11, it is in a state where the charge path from the charge/discharge target device 300-1 to the charge/discharge target device 300-2 has been established, and charge start is being waited for. Consequently, in the charge execution status display region A11, there is displayed a "Connection confirmed" message indicating that the charge path has been established.

The message display region A12 is a region where various types of messages such as operation suggestions and function setting status display are displayed. In the example of FIG. 11, there is displayed a "Charging will start when terminal is tilted" message, as a suggested operation for commencing charging.

The charging status display region A13 is a region where there is displayed a charging status such as the distinction of whether or not charging is being performed and the charging speed (charging electric power). In the example of FIG. 11, it is in a state prior to charging commencement, and so the charging speed is not displayed.

In the charging status display region A13, there is displayed a container (cup) with liquid (water) therein. This container represents the power supply, and the liquid represents the charging electric current. In the example of FIG. 11, it is in a state prior to charging commencement, and there is displayed an image of liquid accumulated within the container.

The charging rate display region A14 is a region where there is displayed the charging rate of a charge target. In the example of FIG. 11, there are displayed the charging rate "10%" of the charge/discharge target device 300-2, which is the charge target, and the image of a battery that represents the charge target.

The operation region A15 is a region where user operations are received. In the example of FIG. 11, there is displayed a "Finish" button that receives an operation for ending the charging process. This "Finish" button is a button icon that receives a charge end operation to instruct: release of the power supply (dissolution of power supply securement), termination of process of the control device with respect to the charging, and termination of the charge/discharge control application of the terminal device 200.

After having displayed the initial screen of the charge execution screen in sequence S204, the terminal device 200 detects the tilt of the main body (casing) of the terminal device 200 (sequence S211). The terminal device 200 transmits, to the control device 100, tilt information that indicates the detected tilt (sequence S212).

Specifically, the tilt sensor 250 measures (detects) the tilt of the terminal device 200, and outputs data indicating the measurement result to the charge/discharge execution processor 263. The charge/discharge execution processor 263 formats the measurement result data from the tilt sensor 250 into tilt information according to the method of communication with the control device 100, and transmits it to the control device 100 via the communication unit 210 and the terminal communication network 501.

As shown in the message display region A12 of FIG. 11, the user of the charge/discharge control system 1 can start charging with an operation of tilting the terminal device 200 (in the direction along (parallel to) the display screen, that is, in the direction of rotating the vertically long screen to the horizontally long screen while the screen is maintained front facing).

In order to perform the charge/discharge control according to this operation, having received the tilt information from the terminal device 200, the control device 100 generates control information based on the tilt information (sequence S213), and transmits it to the charge/discharge target devices 300-1 and 300-2 (sequence S214).

Specifically, first, the terminal device communication unit 111 receives the tilt information from the terminal device 200 and outputs it to the charge/discharge controller 123. Then, the charge/discharge controller 123 generates control information with respect to each of the charge/discharge target devices 300-1 and 300-2 based on the tilt information.

The charge/discharge controller 123 transmits the generated control information to each of the charge/discharge target devices 300-1 and 300-2 via the target device communication unit 112 and the target communication network 502. The control device 100 may perform ON/OFF control (two-value control) for switching ON and OFF of charging, or it may perform quantitative control (multiple-value control) that controls the charging speed or the charging amount.

Having received the control information from the control device 100, the charge/discharge target devices 300-1 and 300-2 perform charging according to the received control information (sequence S215). Moreover, the charge/discharge target devices 300-1 and 300-2 regularly transmit, to the control device 100, status information showing the charging status such as an indication of charging being performed, charging speed (charging electric power), and charging rate of the charge/discharge target device 300-2 (charge target) (sequence S216).

Having received the status information, the control device 100 generates charging status information that indicates the charging status to be displayed on the terminal device 200, and transmits it to the terminal device 200 (sequence S217). Specifically, first, the target device communication unit 112 receives the status information and transmits it to the charge/discharge controller 123. Next, the charge/discharge controller 123 extracts, from the status information, the indication of charging being performed, the charging speed (charging electric power), and charging rate of the charge/discharge target device 300-2, as information that indicates the charging status to be displayed on the terminal device 200. The charge/discharge controller 123 generates charging status information that includes the extracted information, and transmits it via the terminal device communication unit 111 and the terminal communication network 501 to the terminal device 200.

Having received the charging status information, the terminal device 200 updates the power charge execution screen based on the charging status information (sequence S218). Specifically, first, the communication unit 210 receives the charging status information from the control device 100 and transmits it to the charge/discharge execution processor 263. The charge/discharge execution processor 263 generates display image data of the charge execution screen based on the charging status information, and outputs it to the display unit 220. The display unit 220 displays (updates) the charge execution screen based on the display image data from the charge/discharge execution processor 263.

Hereunder, the charge/discharge control system 1 repeats the process of sequences S211 to S218 until the charging ends upon being fully charged or by a charge end operation. That is to say, the process is repeated in which the terminal device 200 detects the tilt of the main body of the terminal device 200, the control device 100 controls supply of electric power from the charge/discharge target device 300-1 to the charge/discharge target device 300-2 according to the tilt, and the terminal device 200 displays the execution status of charging.

Figure 12:
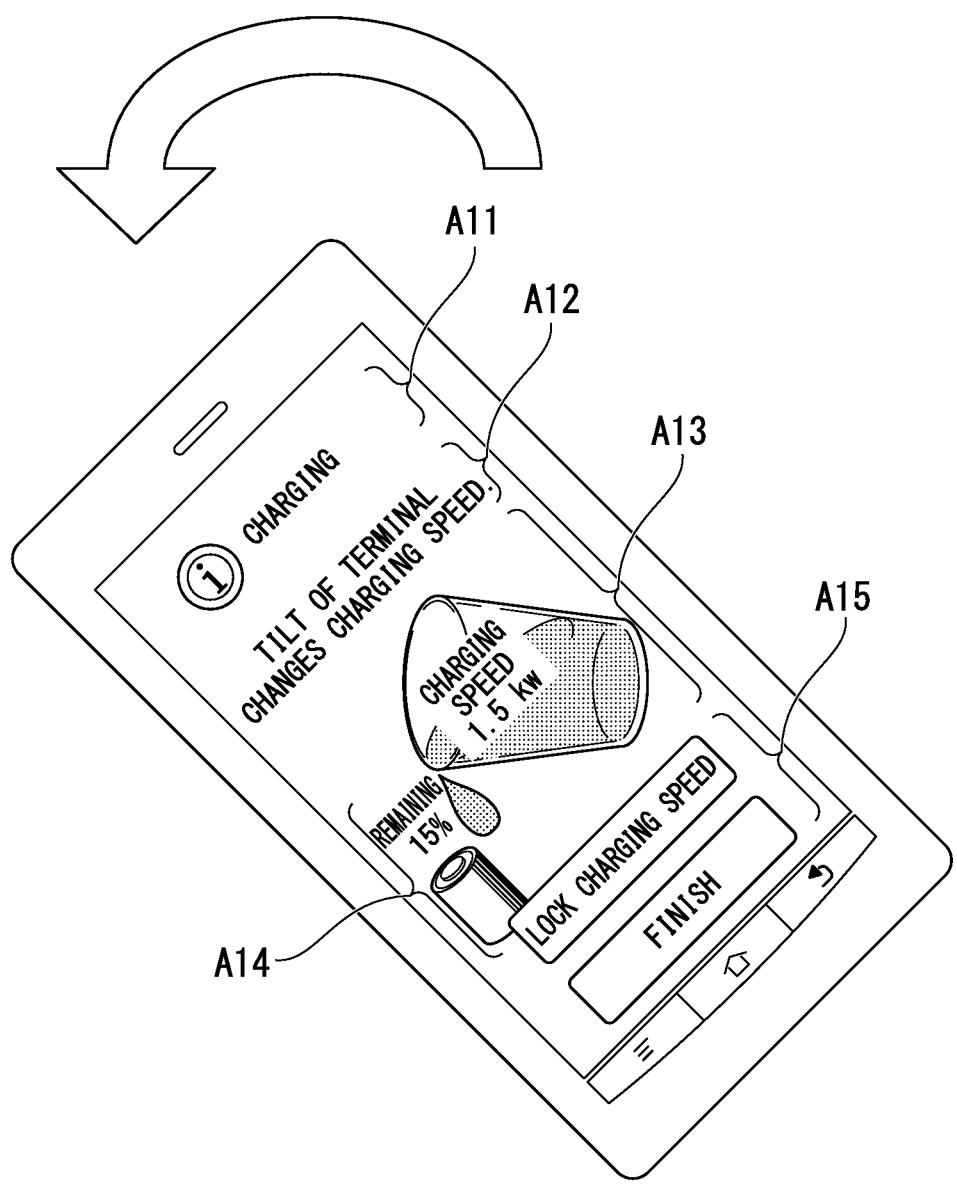
FIG. 12 is an explanatory diagram showing an example of displaying the charge execution screen in a case where charging is being performed in the present exemplary embodiment.

FIG. 12 is an explanatory diagram showing an example of displaying the charge execution screen in the case where charging is being performed. As with the case of FIG. 11, in FIG. 12, the charge execution screen has a charge execution status display region A11, a message display region A12, a charging status display region A13, a charging rate display region A14, and an operation region A15.

In the example of FIG. 12, (the secondary battery included in) the charge/discharge target device 300-2 is being charged by the charge/discharge target device 300-1 supplying electric power to the charge/discharge target device 300-2, and in the charge execution status display region A11, there is displayed a "Charging" message.

In the message display region A12, there is displayed a message of "Tilt of the terminal changes the speed of charging" as a suggested operation for changing the charging status.

In the charging status display region A13, "the charging speed (charging electric power) 1.5 kilowatt (kw)" is displayed. Furthermore, in the example of FIG. 12, as an image of an indication of charging being performed, there is displayed an image showing that the liquid is flowing to the battery that represents the charging target as the container is tilted.

In the charging rate display region A14, the charging rate is updated to remaining 15 percent (%).

In the operation region A15, there is displayed a charging status lock button with text "Lock the charging speed" printed thereon, in addition to the Finish button. This charging status lock button is a button icon that receives a charging status lock operation for requesting the charging status to be maintained.

For example, in a case where the operation input unit 230 detects that a charging status lock operation has been performed (a touch operation on the charging status lock button), then, even if the tilt of the terminal device 200 changes, the communication unit 210 continues to transmit a signal indicating the tilt at the time of the charging status lock operation being performed. Then, according to the signal from the terminal device 200, the control device 100 controls the charge/discharge target devices 300-1 and 300-2 so that the charge/discharge target device 300-2 is charged at the charging speed (charging electric power) at the time of the charging status lock operation being performed. In this manner, when a charging status lock operation is performed, the charge/discharge control system 1 performs control to maintain charging speed.

Figure 13:
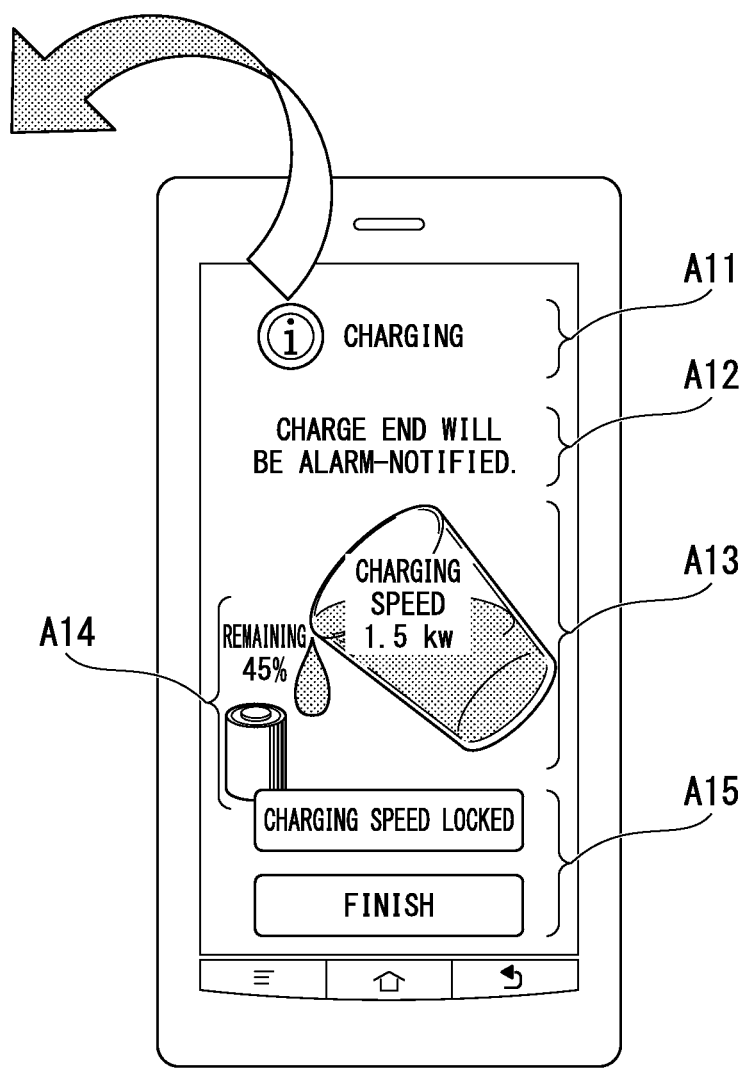
FIG. 13 is an explanatory diagram showing another example of displaying the charge execution screen in the case where charging is being performed in the present exemplary embodiment.

FIG. 13 is an explanatory diagram showing another example of displaying the charge execution screen in the case where charging is being performed. As with the case of FIG. 11 and FIG. 12, in FIG. 13, the charge execution screen has a charge execution status display region A11, a message display region A12, a charging status display region A13, a charging rate display region A14, and an operation region A15.

FIG. 13 shows an example of displaying a charge execution screen in the case where the tilt sensor 250 detects the terminal device 200 being in a horizontal state when the terminal device 200 is placed on a desk. The charge/discharge execution processor 263 has detected a user operation of bringing the terminal device 200 into a horizontal state as a charging status lock operation, and thus the charging status lock button in the operation region A15 displays a message "Charging speed locked". In order to enable continuation of charging even if the user (the user of the charge/discharge control system 1) places the terminal device on a desk or the like, the user operation of bringing the terminal device 200 into a horizontal state is treated as a charging status lock operation.

Moreover, in the example of FIG. 13, the charging status is maintained by charging status locking, and the display of the charge execution status display region A11 and the display of the charging status display region A13 are similar to those in the case of FIG. 12.

On the other hand, assuming a case where the user of the charge/discharge control system 1 leaves the terminal device 200 to rest, if the tilt sensor 250 detects that the terminal device 200 has been brought into a horizontal state, the terminal device 200 sets an alarm notification for the time of charge end. With this setting having been performed, the message display region A12 displays a message of "Notify charge end with alarm".

Next, operations of each of the terminal device 200 and the control device 100 are described, with reference to FIG. 14 to FIG. 18.

Figure 14:
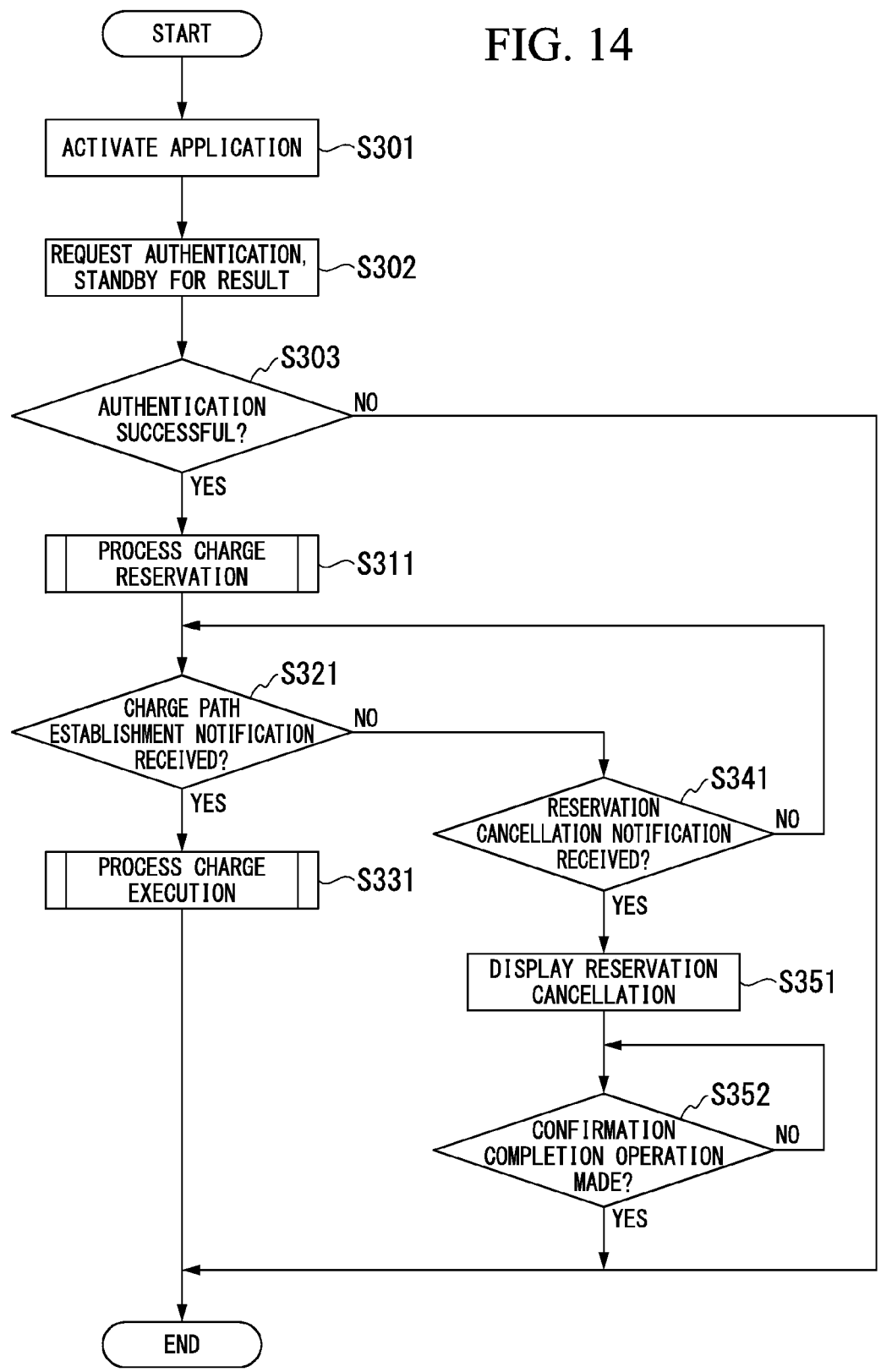
FIG. 14 is a flow chart showing processing steps to be performed by the terminal device in the present exemplary embodiment.

FIG. 14 is a flow chart showing processing steps to be performed by the terminal device 200. As shown in the example of FIG. 6, when the operation input unit 230 detects a user operation for activating the charge/discharge control application, the terminal device 200 begins the process of FIG. 14.

In the process of FIG. 14, step S301 corresponds to sequence S101 of FIG. 5. In step S301, (the CPU included in) the terminal device 200 activates the charge/discharge control application.

Step S302 and step S303 correspond to sequence S102 and sequence S104 of FIG. 5.

In step S302, the authentication request processor 261 transmits an authentication request to the control device 100 via the communication unit 210 and the terminal communication network 501, and waits for the authentication result.

Then, the communication unit 210 receives the authentication result from the control device 100, and outputs it to the authentication request processor 261.

In step S303, the authentication request processor 261 determines whether or not the authentication has succeeded, based on the authentication result from the communication unit 210. If the authentication request processor 261 determines that the authentication has failed (step S303: NO), the process of FIG. 14 ends. On the other hand, if the authentication request processor 261 determines that the authentication is successful (step S303: YES), the process proceeds to step S311.

In step S311, the reservation request processor 262, which has inherited the process from the authentication request processor 261, performs a charge reservation process.

Figure 15:
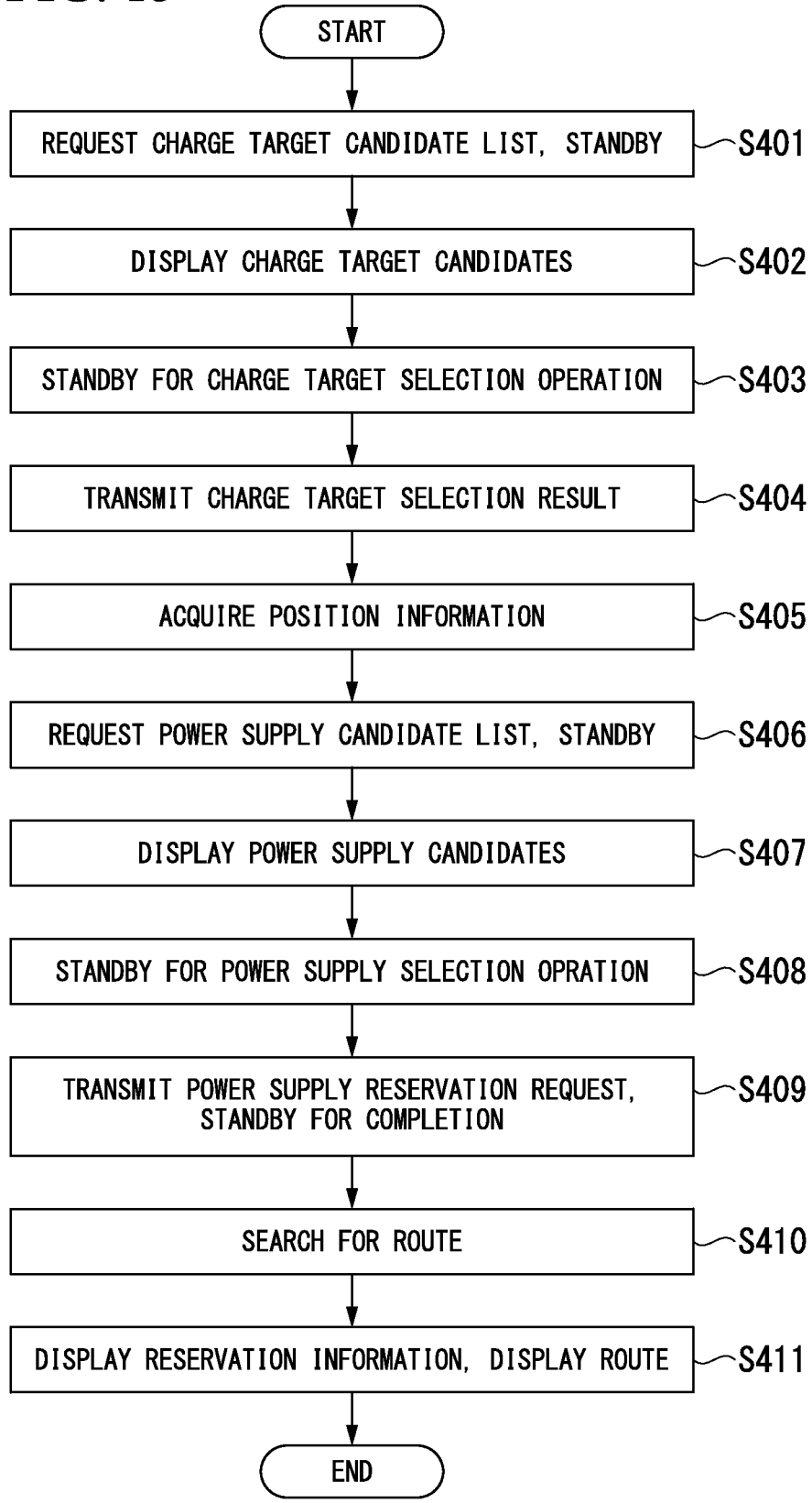
FIG. 15 is a flow chart showing processing steps in which the terminal device performs a charge reservation process in the present exemplary embodiment.

FIG. 15 is a flow chart showing processing steps performed by the terminal device 200 to perform a charge reservation process. In step S311 of FIG. 14, the terminal device 200 performs the process of FIG. 15.

In the process of FIG. 15, step S401 corresponds to sequence S111 and sequence S113 of FIG. 5. In step S401, the reservation request processor 262 generates a request for a charge target candidate list, and transmits it to the control device 100 via the communication unit 210 and the terminal communication network 501. At this time, the reservation request processor 262 includes user information (for example, identification information of the user of the charge/discharge control system 1 (the user of the terminal device 200)) in the request for the charge target candidate list, and transmits it, and then waits for the charge target candidate list. Then, the communication unit 210 receives the charge target candidate list from the control device 100, and outputs it to the reservation request processor 262.

Step S402 corresponds to sequence S114 of FIG. 5. In step S402, the communication unit 210 receives the charge target candidate list and outputs it to the reservation request processor 262. The reservation request processor 262, based on the charge target candidate list, generates display image data of the charge target candidates and outputs the data to the display unit 220. The display unit 220 displays the charge target candidates based on the display image data from the reservation request processor 262.

Step S403 corresponds to sequence S115 of FIG. 5. In step S403, upon detecting a charge target selection operation, the operation input unit 230 supplies information that indicates the detected operation to the reservation request processor 262. The reservation request processor 262 identifies the selected charge target based on the information from the operation input unit 230.

Step S404 corresponds to sequence S116 of FIG. 5. In step S404, as the result of the charge target selection, the reservation request processor 262 transmits the identification information of the selected charge target to the control device 100 via the communication unit 210 and the terminal communication network 501.

Step S405 corresponds to sequence S121 of FIG. 5. In step S405, the position information acquisition unit 240 acquires the position information of the terminal device 200, and outputs it to the reservation request processor 262.

Step S406 corresponds to sequence S122 and sequence S124 of FIG. 5. In step S406, the reservation request processor 262 generates a transmission request for a power supply candidate list with the position information of the terminal device 200 included in the request, and transmits it to the control device 100 via the communication unit 210 and the terminal communication network 501. The reservation request processor 262 waits for the power supply candidate list, and the communication unit 210 receives the power supply candidate list and outputs it to the reservation request processor 262.

Step S407 corresponds to sequence S125 of FIG. 5. In step S407, first, the reservation request processor 262 acquires peripheral map data of the current position of the terminal device 200 based on the position information of the terminal device 200 acquired by the position information acquisition unit 240. Based on the acquired map data and the power supply candidate list, the reservation request processor 262 generates display image data of the power supply candidates and outputs it to the display unit 220. The display unit 220 displays the power supply candidates based on the display image data from the reservation request processor 262.

Step S408 corresponds to sequence S126 of FIG. 5. In step S408, upon detecting a power supply selection operation, the operation input unit 230 outputs information that indicates the detected operation to the reservation request processor 262. The reservation request processor 262 identifies the selected power supply based on the information from the operation input unit 230.

Step S409 corresponds to sequence S131 and sequence S134 of FIG. 5. In step S409, the reservation request processor 262 generates a charge reservation request that includes power supply identification information and the charge target identification information, and transmits it to the control device 100 via the communication unit 210 and the terminal communication network 501. Then the reservation request processor 262 waits for a reservation completion notification. The communication unit 210 receives the reservation completion notification, and outputs it to the reservation request processor 262.

Step S410 corresponds to sequence S135 of FIG. 5. In step S410, the reservation request processor 262 searches for a route to the power supply from the current position of the terminal device 200 detected by the position information acquisition unit 240.

Step S411 corresponds to sequence S136 of FIG. 5. In step S411, the reservation request processor 262 first extracts the reservation information from the reservation completion notification received from the control device 100, and generates image data that indicates the reservation information. Moreover, the reservation request processor 262 generates image data that indicates the route search result on the peripheral map data of the terminal device 200. The reservation request processor 262 combines the generated reservation information image data with the image data indicating the route search result to generate display image data, and outputs it to the display unit 220. The display unit 220 displays the reservation information and the route search result based on the display image data from the reservation request processor 262.

Then, the process of FIG. 15 ends, and the terminal device 200 continues performing the process of step S321 and subsequent steps thereof of FIG. 14.

If the operation input unit 230 detects a reservation cancellation operation, the reservation request processor 262 performs a reservation cancellation process (a process of cancelling the reservation and releasing the power supply) in interrupt processing, and ends the charge/discharge control application.

Step S321 corresponds to sequence S203 of FIG. 10. In step S321, the reservation request processor 262 determines whether or not the communication unit 210 has received a charge path establishment notification. If the reservation request processor 262 determines that a charge path establishment notification has not been received (step S321: NO), the process proceeds to step S341.

In step S341, the reservation request processor 262 determines whether or not the communication unit 210 has received a reservation cancellation notification. This reservation cancellation notification is a notification to be transmitted to the terminal device if the reservation has timed out, or if the reservation is cancelled based on the operation of the user of the charge/discharge control system 1, or the like.

If the reservation request processor 262 determines that a reservation cancellation notification has not been received (step S341: NO), the process returns to step S321. On the other hand, if the reservation request processor 262 determines that the reservation cancellation notification has been received (step S341: YES), the process proceeds to step S351.

In step S351, the reservation request processor 262 generates display image data that indicates that the reservation has been cancelled, and outputs it to the display unit 220. The display unit 220 displays that the reservation has been cancelled.

In step S352, the reservation request processor 262 determines whether or not the operation input unit 230 has detected a confirmation completion operation. The confirmation completion operation here is an operation to be performed by the user of the charge/discharge control system 1 (the user of the terminal device 200) as they confirm that the reservation has been cancelled. For example, the operation input unit 230 may detect that a touch operation on the screen displaying the reservation has been cancelled, as a confirmation completion operation.

In step S352, if the reservation request processor 262 determines that the operation input unit 230 has detected no confirmation completion operation (step S352: NO), the process returns to step S352. On the other hand, if the reservation request processor 262 determines that the operation input unit 230 has detected a confirmation completion operation (step S352: YES), the process of FIG. 14 ends.

On the other hand, in step S321, if the reservation request processor 262 determines that the charge path establishment notification has been received (step S321: YES), the process proceeds to step S331.

In step S311, the charge/discharge execution processor 263, which has inherited the process from the reservation request processor 262, performs a charge execution process.

Figure 16:
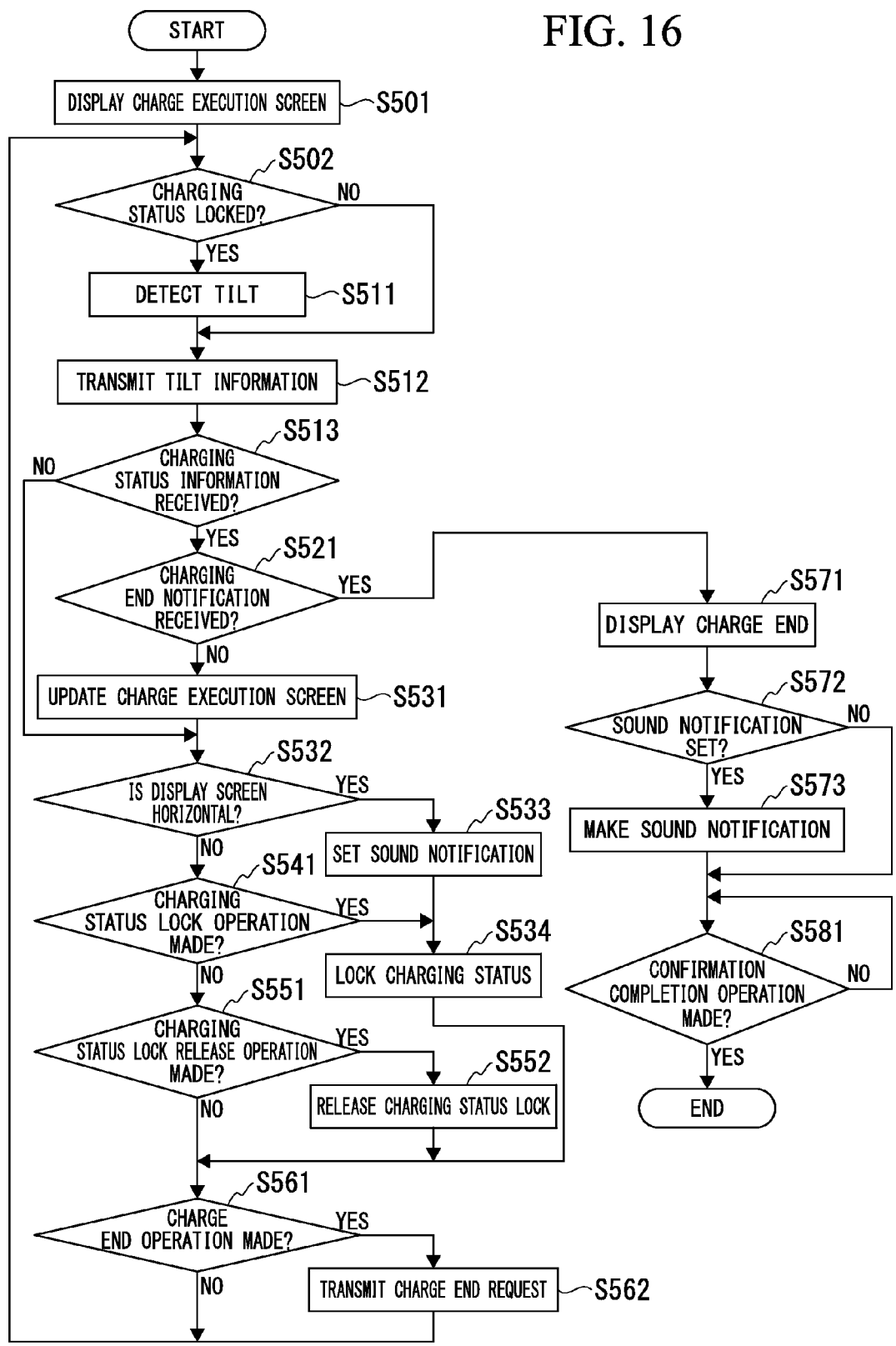
FIG. 16 is a flow chart showing processing steps in which the terminal device performs a charge execution process in the present exemplary embodiment.

FIG. 16 is a flow chart showing processing steps performed by the terminal device 200 to perform a charge execution process. In step S331 of FIG. 14, the terminal device 200 performs the process of FIG. 16.

In the process of FIG. 16, step S501 corresponds to sequence S204 of FIG. 10. In step S501, the charge/discharge execution processor 263 generates image data of the initial screen of the charge execution screen, and outputs it to the display unit 220. The display unit 220 displays the initial screen of the charge execution screen based on this image data.

In step S502, the charge/discharge execution processor 263 determines whether or not charging status lock has been performed. For example, the memory unit 270 may memorize a charging status lock flag, which indicates whether or not charging status lock has been performed, and the charge/discharge execution processor 263 may determine whether or not the charging status lock has been performed, based on the value of this charging status lock flag.

If the charge/discharge execution processor 263 determines the charging status lock has not been performed (step S502: NO), the process proceeds to step S511. If the charge/discharge execution processor 263 determines the charging status lock has been performed (step S502: YES), the process proceeds to step S512.

Step S511 corresponds to sequence S211 of FIG. 10. In step S511, first, the tilt sensor 250 measures (detects) the tilt of the terminal device 200, and outputs data indicating the measurement result to the charge/discharge execution processor 263. The charge/discharge execution processor 263 formats the measurement result data from the tilt sensor 250 into tilt information according to the method of communication with the control device 100, and generates tilt information.

Step S512 corresponds to sequence S212 of FIG. 10. In step S512, the charge/discharge execution processor 263 transmits the tilt information to the control device 100 via the communication unit 210 and the terminal communication network 501. If the charging status is locked (in a case where step S502 is NO), the charge/discharge execution processor 263 transmits the tilt information with the same content as that of the previously transmitted tilt information.

Step S513 corresponds to sequence S217 of FIG. 10. In step S513, the charge/discharge execution processor 263 determines whether or not the communication unit 210 has received the charging status information. If the charge/discharge execution processor 263 determines that the charging status information has been received (step S513: YES), the process proceeds to step S521. On the other hand, if the charge/discharge execution processor 263 determines that the charging status information has not been received (step S513: NO), the process proceeds to step S532.

In step S521, the charge/discharge execution processor 263 determines whether or not the communication unit 210 has received a charge end notification. This charge end notification is a notification to be transmitted to the terminal device 200 in a case where the charge target has become fully charged, or charging has ended based on the operation of the user of the charge/discharge control system 1, or in a case where there is detected a charge end due to disconnection of the charge path from the power supply to the charge target.

If the charge/discharge execution processor 263 determines that the charge end notification has been received (step S521: YES), the process proceeds to step S571.

In step S571, the charge/discharge execution processor 263 generates display image data that indicates that charging has ended, and outputs it to the display unit 220. The display unit 220 displays that the charging has ended.

In step S572, the charge/discharge execution processor 263 determines whether or not the sound notification has been set. The sound notification setting here is a setting for notifying with sound that charging has ended as with the alarm notification setting that has been described with reference to FIG. 13.

If the charge/discharge execution processor 263 determines that the sound notification has been set (step S572: YES), the process proceeds to step S573. If the charge/discharge execution processor 263 determines that the sound notification has not been set (step S572: NO), the process proceeds to step S581.

In step S573, the charge/discharge execution processor 263 performs a sound notification of the charge end. For example, the charge/discharge execution processor 263 may output an alarm sound from a speaker included in the terminal device 200.

In step S581, the reservation request processor 262 determines whether or not the operation input unit 230 has detected a confirmation completion operation. The confirmation completion operation here is an operation to be performed by the user of the charge/discharge control system 1 (the user of the terminal device 200) as they confirm that charging has ended. For example, the operation input unit 230 may detect a touch operation on the screen displaying that charging has ended, as a confirmation completion operation.

In step S581, if the reservation request processor 262 determines that the operation input unit 230 has detected no confirmation completion operation (step S581: NO), the process returns to step S581. On the other hand, if the reservation request processor 262 determines that the operation input unit 230 has detected a confirmation completion operation (step S581: YES), the process of FIG. 16 and the process of FIG. 14 end.

In step S521, if the charge/discharge execution processor 263 determines that a charge end notification has been received (step S521: YES), the process proceeds to step S531.

Step S531 corresponds to sequence S218 of FIG. 10. In step S531, the charge/discharge execution processor 263 generates display image data of the charge execution screen based on the charging status information that the communication unit 210 has received from the control device 100, and outputs the data to the display unit 220. The display unit 220 displays (updates) the charge execution screen based on the display image data from the charge/discharge execution processor 263.

In step S532, the charge/discharge execution processor 263 determines whether or not the tilt sensor 250 has detected that the display screen of the display unit 220 has been brought to a horizontal state.

If the charge/discharge execution processor 263 determines that the display screen of the display unit 220 has been detected as having been brought to a horizontal state (step S532: YES), the process proceeds to step S533.

In step S533, the charge/discharge execution processor 263 sets a sound notification for the time of charge end.

In step S534, the charge/discharge execution processor 263 sets charging status lock (that is to say, it sets the charging status to be maintained).

Then, the process proceeds to step S561.

On the other hand, if the charge/discharge execution processor 263 determines that the display screen of the display unit 220 has not been detected as having been brought to a horizontal state (step S532: NO), the process proceeds to step S541.

In step S541, the charge/discharge execution processor 263 determines whether or not the operation input unit 230 has detected a charging status lock operation. If the charge/discharge execution processor 263 determines that the operation input unit 230 has detected a charging status lock operation (step S541: YES), the process proceeds to step S534. On the other hand, if the charge/discharge execution processor 263 determines that the operation input unit 230 has not detected a charging status lock operation (step S541: NO), the process proceeds to step S551.

In step S551, the charge/discharge execution processor 263 determines whether or not the operation input unit 230 has detected a charging status lock release operation. The charging status lock release operation is an operation for requesting charging status lock release (that is to say, an operation for requesting the maintenance of the charging status to end). For example, when the charging status lock is locked, the display unit 220 may display a button icon with text "Charging speed locked" printed thereon. Then, the operation input unit 230 may detect a touch operation made on this button icon as a charging status lock operation.

In step S551, if the charge/discharge execution processor 263 determines that the operation input unit 230 has detected a charging status lock release operation (step S551: YES), the process proceeds to step S552. On the other hand, if the charge/discharge execution processor 263 determines that the operation input unit 230 has not detected a charging status lock release operation (step S551: NO), the process proceeds to step S561.

In step S552, the charge/discharge execution processor 263 releases the charging status lock (that is to say, it sets to end the maintenance of the charging status).

Then, the process proceeds to step S561.

In step S561, the charge/discharge execution processor 263 determines whether or not the operation input unit 230 has detected a charge end operation. If the charge/discharge execution processor 263 determines that the operation input unit 230 has detected a charge end operation (step S561: YES), the process proceeds to step S562. On the other hand, if the charge/discharge execution processor 263 determines that the operation input unit 230 has not detected a charge end operation (step S561: NO), the process returns to step S502.

In step S562, the charge/discharge execution processor 263 transmits a charge end request to the control device 100 via the communication unit 210 and the terminal communication network 501. This charge end request is a request to end the supply of electric power from the power to the charge target.

Then, the process returns to step S502.

Figure 17:
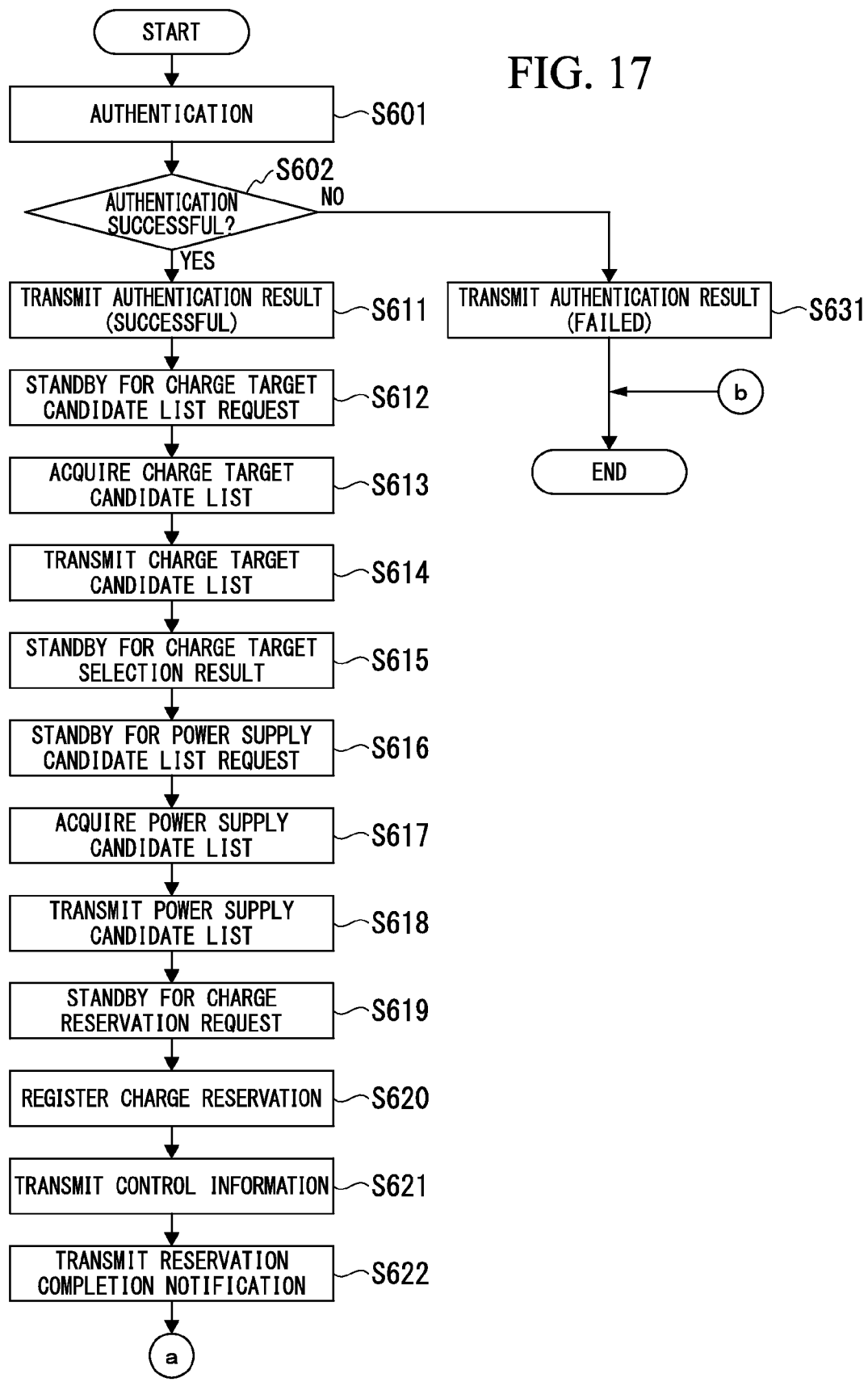
FIG. 17 is a flow chart showing processing steps to be performed by the control device in the present exemplary embodiment.
Figure 18:
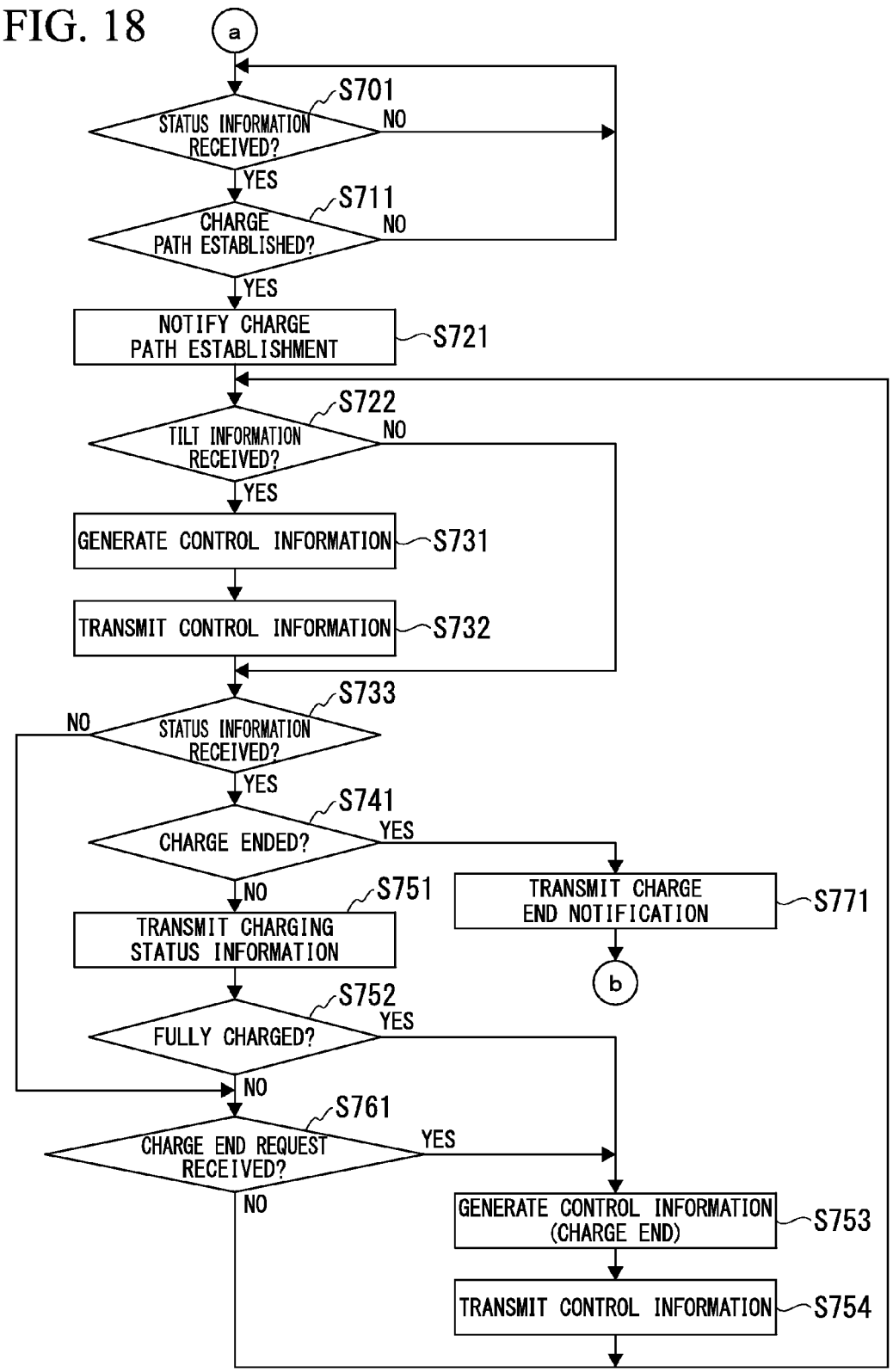
FIG. 18 is a flow chart showing processing steps to be performed by the control device in the present exemplary embodiment.

FIG. 17 and FIG. 18 are flow charts showing processing steps to be performed by the control device 100. The control device 100 begins the processes of FIG. 17 and FIG. 18 every time an authentication request from the terminal device 200 is received.

In the processes of FIG. 17 and FIG. 18, step S601 and step S602 correspond to sequence S102 and sequence S103 of FIG. 5.

In step S601, the terminal device communication unit 111 supplies the authentication processor 121 with an authentication request from the terminal device 200. The authentication processor 121 authenticates the authentication request.

For example, as described above, the authentication processor 121 may perform user authentication using password authentication.

In step S602, the authentication processor 121 determines whether or not the authentication in step S601 has been successful.

If the authentication processor 121 determines that the authentication has failed (step S602: NO), the process proceeds to step S631. In step S631, the authentication processor 121 transmits the authentication result, which indicates authentication failure, to the terminal device 200 via the terminal device communication unit 111 and the terminal communication network 501.

Then, the processes of FIG. 17 and FIG. 18 end.

On the other hand, in step S602, if the authentication processor 121 determines that the authentication has succeeded (step S602: YES), the process proceeds to step S611.

Step S611 corresponds to sequence S104 of FIG. 5. In step S611, the authentication processor 121 transmits the authentication result, which indicates authentication success, to the terminal device 200 via the terminal device communication unit 111 and the terminal communication network 501. Moreover, the reservation processor 122 inherits the process from the authentication processor 121.

Step S612 corresponds to sequence S111 of FIG. 5. In step S612, the terminal device communication unit 111 receives the transmission request for a charge target candidate list transmitted from the terminal device 200, and outputs it to the reservation processor 122.

Step S613 corresponds to sequence S112 of FIG. 5. In step S613, the reservation processor 122 acquires (for example, generates) a charge target candidate list, according to the transmission request for a charge target candidate list.

Step S614 corresponds to sequence S113 of FIG. 5. In step S614, the reservation processor 122 transmits the charge target candidate list to the terminal device 200 via the terminal device communication unit 111 and the terminal communication network 501.

Step S615 corresponds to sequence S116 of FIG. 5. In step S615, the terminal device communication unit 111 receives the charge target selection result transmitted from the terminal device 200, and outputs it to the reservation processor 122.

Step S616 corresponds to sequence S122 of FIG. 5. In step S616, the terminal device communication unit 111 receives the transmission request for the power supply candidate list transmitted from the terminal device 200, and outputs it to the reservation processor 122.

Step S617 corresponds to sequence S123 of FIG. 5. In step S617, the reservation processor 122 acquires (for example, generates) a power supply candidate list, according to the transmission request for a power supply candidate list. At this time, the reservation processor 122 acquires a list of power supplies that conform with the specification of the charge target, based on the charge target selection result.

Step S618 corresponds to sequence S124 of FIG. 5. In step S618, the reservation processor 122 transmits the power supply candidate list to the terminal device 200 via the terminal device communication unit 111 and the terminal communication network 501.

Step S619 corresponds to sequence S131 of FIG. 5. In step S619, the terminal device communication unit 111 receives the charge reservation request transmitted from the terminal device 100, and outputs it to the reservation processor 122.

Step S620 corresponds to sequence S132 of FIG. 5. In step S620, the reservation processor 122 registers power supply reservation information into the memory unit 130.

Step S621 corresponds to sequence S133 of FIG. 5. In step S621, the reservation processor 122 transmits a control signal that suppresses electric power output, to the power supply via the target device communication unit 112 and the target communication network 502.

Step S622 corresponds to sequence S134 of FIG. 5. In step S622, the reservation processor 122 transmits a reservation completion notification to the terminal device 200 via the terminal device communication unit 111 and the terminal communication network 501. Moreover, the charge/discharge controller 123 inherits the process from the reservation processor 122.

Then, the process proceeds to step S701 (FIG. 18).

Step S701 corresponds to sequence S201 of FIG. 10. In step S701, the charge/discharge controller 123 determines whether or not status information has been received from the power supply or the charge target, or from both of them. If the charge/discharge controller 123 determines that status information has not been received (step S701: NO), the process returns to step S701. On the other hand, if the charge/discharge controller 123 determines that the status information has been received (step S701: YES), the process proceeds to step S711.

Step S711 corresponds to sequence S202 of FIG. 10. In step S711, the charge/discharge controller 123 determines whether or not the power supply and the charge target have been connected to each other, based on the status information. If the charge/discharge controller 123 determines that the power supply and the charge target have not been connected (step S711: NO), the process returns to step S701. On the other hand, if the charge/discharge controller 123 determines that the power supply and the charge target have been connected (step S711: YES), the process proceeds to step S721.

Step S721 corresponds to sequence S203 of FIG. 10. In step S721, the charge/discharge controller 123 generates a charge path establishment notification, and transmits it to the terminal device 200 via the terminal device communication unit 111 and the terminal communication network 501.

Step S722 corresponds to sequence S212 of FIG. 10. In step S722, the charge/discharge controller 123 determines whether or not the terminal device communication unit 111 has received tilt information. If the charge/discharge controller 123 determines that the terminal device communication unit 111 has received tilt information (step S722: YES), the process proceeds to step S731. On the other hand, if the charge/discharge controller 123 determines that the terminal device communication unit 111 has not received tilt information (step S722: NO), the process proceeds to step S732.

Step S731 corresponds to sequence S213 of FIG. 10. In step S731, the charge/discharge controller 123 generates control information for each of the power supply and the charge target, based on the tilt information that the terminal device communication unit 111 has received.

Step S732 corresponds to sequence S214 of FIG. 10. In step S732, the charge/discharge controller 123 transmits the control information generated in step S731 to each of the power supply and the charge target, via the target device communication unit 112 and the target communication network 502.

Step S733 corresponds to sequence S216 of FIG. 10. In step S733, the charge/discharge controller 123 determines whether or not the target device communication unit 112 has received status information from the power supply or the charge target, or from both of them. If the charge/discharge controller 123 determines that the target device communication unit 112 has received status information (step S733: YES), the process proceeds to step S741. On the other hand, if the charge/discharge controller 123 determines that the target device communication unit 112 has not received status information (step S733: NO), the process proceeds to step S761.

In step S741, the charge/discharge controller 123 determines based on the status information whether or not charging (supply of electric power) from the power supply to the charge target has ended. The power supply and the charge target end charging according to the control information that is transmitted from the control device 100 to instruct a charge end.

Moreover, the power supply and the charge target end charging also in a case where the charge path from the power supply to the charge target is disconnected and charging becomes impossible. If the charge/discharge controller 123 determines that charging has not ended (step S741: NO), the process proceeds to step S751.

Step S751 corresponds to sequence S217 of FIG. 10. In step S751, the charge/discharge controller 123 generates charging status information based on the status information, and transmits it to the terminal device 200 via the terminal device communication unit 111 and the terminal communication network 501.

In step S752, the charge/discharge controller 123 determines based on the status information whether or not the charge target is in a fully charged state (step S752). If the charge/discharge controller 123 determines that the charge target is in a fully charged state (step S752: YES), the process proceeds to step S753.

In step S753, the charge/discharge controller 123 generates, for each of the power supply and the charge target, control information to instruct a charge end.

In step S754, the charge/discharge controller 123 transmits, to each of the power supply and the charge target via the target device communication unit 112 and the target communication network 502, control information of a charge end instruction generated in step S752.

Then, the process returns to step S722.

On the other hand, in step S752, if the charge/discharge controller 123 determines that the charge target is not in a fully charged state (step S752: NO), the process proceeds to step S761.

In step S761, the charge/discharge controller 123 determines whether or not the terminal device communication unit 111 has received a charge end request. If the charge/discharge controller 123 determines that the terminal device communication unit 111 has received a charge end request (step S761: YES), the process proceeds to step S753. On the other hand, if the charge/discharge controller 123 determines that the terminal device communication unit 111 has not received a charge end request (step S761: NO), the process proceeds to step S722.

On the other hand, in step S741, if the charge/discharge controller 123 determines that charging has ended (step S741: YES), the process proceeds to step S771.

In step S771, the charge/discharge controller 123 generates a charge end notification, and transmits it to the terminal device 200 via the terminal device communication unit 111 and the terminal communication network 501.

Then, the process of FIG. 17 and the process of FIG. 18 end.

As described above, the communication unit 210 transmits a signal according to the tilt of the terminal device 200 detected by the tilt sensor 250, and the display unit 220 displays the status of charging performed according to the tilt. Accordingly, the user of the charge/discharge control system 1 can control supplying and receiving of electric power between charge/discharge target devices 300 with an easy operation of tilting the terminal device 200, and confirm the result of the control.

In particular, the user of the charge/discharge control system 1, by using a device in their possession (for example, a mobile phone, a smart phone, a personal digital assistant device, or a gaming machine) as a terminal device 200, can control supplying and receiving of electric power between the charge/discharge target devices 300, with an easy operation using the device, with which the user is familiar. Accordingly, the user of the charge/discharge control system 1 (one that instructs charging or discharging) can easily perform charging or discharging without the need for learning the method for operating charging and discharging that is defined for each device.

Moreover, the communication unit 210 transmits a charge execution request as a signal according to the tilt, when the tilt sensor 250 detects the tilt.

Accordingly, the user of the charge/discharge control system 1 can, with an easy operation of tilting the terminal device 200, begin and stop supplying and receiving electric power (charging) between the charge/discharge target devices 300 (from the power supply to the charge target).

Furthermore, the display unit 220 displays an image of a tilted container as an indication of charging being performed. Accordingly, the user of the charge/discharge control system 1 can intuitively grasp that supply of electric power from a power supply to the charge target is being performed, from the image of an object (for example, liquid representing electric current) flowing out from a tilted container.

Moreover, the communication unit 210 transmits a charge execution request that includes information indicating the magnitude of the tilt detected by the tilt sensor 250, and the display unit 220 displays the charging speed, which is determined according to the magnitude of this tilt.

Accordingly, the user of the charge/discharge control system 1 can easily adjust charging speed by changing the magnitude of the tilt of the terminal device 200, and confirm the result of the adjustment.

Furthermore, when the operation input unit 230 detects that an operation of requesting the charging status to be maintained (charging status lock operation) has been performed, the communication unit 210 transmits a signal for maintaining the charging status according this request (for example, a charge execution request including the information that indicates the same tilt magnitude as the previous tilt magnitude).

Accordingly, the user of the charge/discharge control system 1 can maintain the charging status without the need for maintaining the tilt of the terminal device 200. For example, even in a case where a prolonged period of time is required for charging the charge target, the user of the charge/discharge control system 1 can perform charging until the charge target is in a fully charged state, without the need for maintaining the tilt of the terminal device 200.

Moreover, when the tilt sensor 250 detects that the orientation of the display screen of the display unit 220 has become level, the communication unit 210 transmits a signal for maintaining the charging status.

Accordingly, the user of the charge/discharge control system 1 can perform a charging status lock operation with an easy operation of tilting the display screen of the display unit 220 to the horizontal orientation (laying down the display screen from the state of holding it where the display screen of the display unit 220 is standing (perpendicularly)). Furthermore, the user of the charge/discharge control system 1 can have the charging state lock to continue by leaving the terminal device 200 to rest on a desk or the like while the posture thereof is maintained.

Moreover, the display unit 220 displays candidates of charge targets that are to receive charging.

Accordingly, the user of the charge/discharge control system 1 can select a charge target from these charge target candidates. In this respect, the user of the charge/discharge control system 1 can select a charge target with an easy operation.

Moreover, the display unit 220 displays candidates of charging power supplies.

Accordingly, the user of the charge/discharge control system 1 can select a power supply from these power supply candidates. In this respect, the user of the charge/discharge control system 1 can select a power supply with an easy operation.

Furthermore, the display unit 220 displays power supply candidates according to the position of the terminal device 200 (for example, ones that are positioned near the terminal device 200).

Accordingly, the user of the charge/discharge control system 1 can select a power supply to which they can easily travel to receive supply of electric power.

Moreover, the control device 100 switches execution and stop of the control in which charging is performed to the charge target from the power supply, based on the information that indicates the tilt of the terminal device 200.

Accordingly, the user of the charge/discharge control system 1 can, with an easy operation of tilting the terminal device 200, begin and stop supplying and receiving electric power from the power supply to the charge target.

Figure 19:
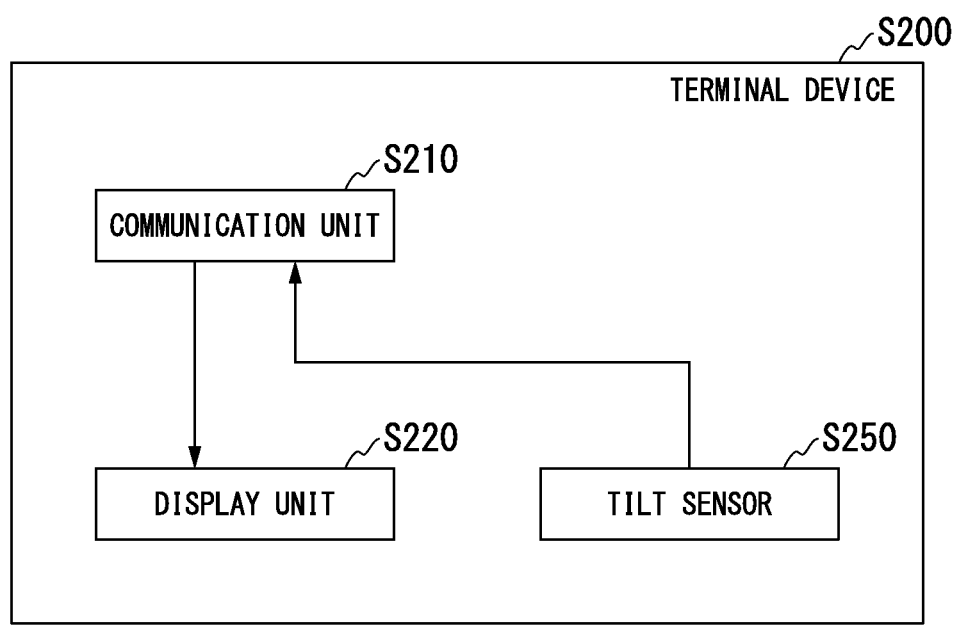
FIG. 19 is a schematic block diagram showing a minimum configuration of a terminal device according to one present exemplary embodiment of the present invention.

Next, a minimum configuration of a terminal device 200 according to one exemplary embodiment of the present invention is described, with reference to FIG. 19.

FIG. 19 is a schematic block diagram showing the minimum configuration of the terminal device 200 of the exemplary embodiment of the present invention, which includes portions of the respective parts shown in FIG. 4. In FIG. 19, among the respective parts of the terminal device 200 shown in FIG. 1, there are shown a communication unit 210, a display unit 220, and a tilt sensor 250.

In the configuration of FIG. 19, as with the case of the configuration shown in FIG. 4, the tilt sensor 25 detects a tilt of the terminal device 200, and the communication unit 210 transmits a signal according to the tilt detected by the tilt sensor 250. Moreover, the display unit 220 displays the status of charging performed according to the tilt detected by the tilt sensor 250.

Accordingly, the user of the charge/discharge control system 1 can control supplying and receiving of electric power between charge/discharge target devices 300 with an easy operation of tilting the terminal device 200, and confirm the result of the control.

A program for realizing all or some functions of the charge/discharge control system 1 may be recorded on a computer-readable recording medium, and the program recorded on this recording medium may be read into a computer and executed, to thereby perform the process of the respect parts. The "computer system" here includes an operating system and hardware such as peripheral devices.

Moreover, the "computer system", in those cases where the World Wide Web system is used, includes a home page providing environment (or a home page displaying environment).

Furthermore, the "computer-readable recording medium" refers to a portable medium such as a flexible disk, a magnetic optical disk, a ROM, and a CD-ROM, and a memory device such as a hard disk drive built into a computer system. Furthermore, the "computer-readable recording medium" includes one that dynamically retains a program for a short period of time such as a communication line in the case where the program is transmitted through a network such as the Internet, and a communication line such as a telephone line, and one that retains a program for a certain period of time such as volatile memory inside a computer system serving as a server or a client in this type case. Moreover, the above program may realize part of the functions described above, and further, it may be capable of realizing the above functions when combined with a program that is already recorded on a computer system.

While the invention has been particularly shown and described with reference to exemplary embodiments thereof, the invention is not limited to these embodiments. It will be understood by those of ordinary skill in the art that various changes in form and details may be made therein without departing from the scope of the present invention as defined by the claims.

The whole or part of the exemplary embodiments disclosed above can be described as, but not limited to, the following supplementary notes.

(Supplementary note 1) A terminal device including: a tilt sensor that detects a tilt; a communication unit that transmits a signal according to the tilt detected by the tilt sensor; and a display unit that displays a status of charging performed according to the tilt detected by the tilt sensor.

(Supplementary note 2) The terminal device according to supplementary note 1, wherein: the communication unit transmits a charge execution request as the signal according to the tilt when the tilt sensor detects the tilt; and the display unit displays charging being performed as the status of the charging.

(Supplementary note 3) The terminal device according to supplementary note 2, wherein the display unit displays an image of a tilted container as an indication of the charging being performed.

(Supplementary note 4) The terminal device according to supplementary note 2 or 3, wherein: the communication unit transmits the charge execution request that includes information indicating a magnitude of the tilt detected by the tilt sensor, and receives information indicating a charging speed that is determined according to the magnitude of the tilt; and the display unit displays the charging speed, in addition to displaying the charging being performed, as the status of the charging.

(Supplementary note 5) The terminal device according to any one of supplementary note 2 through 4, further including an operation input unit that receives an operation for requesting the status of the charging to be maintained, wherein and when the operation input unit detects that the operation for requesting the status of the charging to be maintained, has been performed, a signal for maintaining the status of the charging is transmitted according to the request.

(Supplementary note 6) The terminal device according to any one of supplementary note 2 through 5, wherein when the tilt sensor detects a tilt in a direction of rotating a display screen of the display unit along the display screen, the communication unit transmits the charge execution request, and when the tilt sensor detects that the display screen of the display unit has become horizontal, the communication unit transmits a signal for maintaining the status of charging.

(Supplementary note 7) The terminal device according to any one of supplementary note 1 through 6, wherein the display unit displays candidates of the charge target that receives the charging, and the communication unit transmits information that indicates a charge target selected from the charge target candidates.

(Supplementary note 8) The terminal device according to any one of supplementary note 1 through 7, wherein the display unit displays candidates of the power supply for the charging, and the communication unit transmits information that indicates a power supply selected from the power supply candidates.

(Supplementary note 9) The terminal device according to supplementary note 7, further includes a position information acquisition unit that acquires position information of the terminal device, wherein the communication unit transmits the position information acquired by the position information acquisition unit, and receives information that indicates the power supply candidates according to the position of the terminal device, and the display unit displays the power supply candidates based on the information indicating the power supply candidates received by the communication unit.

(Supplementary note 10) A control device including: a receiver that receives a signal according to a tilt of a terminal device; and a charge and discharge controller that controls charging of a charge target from a power supply, the charge and discharge controller switching execution and stop of control of the charging of the charge target from the power supply, based on the signal according to the tilt of the terminal device received by the receiver.

(Supplementary note 11) A charge and discharge control system including a control device and a terminal device, the terminal device including: a tilt sensor that detects a tilt; a communication unit that transmits a signal according to the tilt detected by the tilt sensor; and a display unit that displays a status of charging performed according to the tilt detected by the tilt sensor, and the control device including: a receiver that receives the signal according to the tilt of the terminal device; and a charge and discharge controller that controls charging of a charge target from a power supply, the charge and discharge controller switching execution and stop of control of the charging of the charge target from the power supply, based on the signal according to the tilt of the terminal device received by the receiver.

(Supplementary note 12) A charge and discharge control adjustment method for a terminal including a tilt sensor that detects a tilt, the method including: transmitting a signal according to the tilt detected by the tilt sensor; and displaying a status of charging performed according to the tilt detected by the tilt sensor.

(Supplementary note 13) A charge and discharge control method for a control device, the method including: receiving a signal according to a tilt of a terminal device; and controlling charging of a charge target from a power supply, the controlling the charging including switching execution and stop of control of the charging of the charge target from the power supply, based on the received signal according to the tilt of the terminal device.

(Supplementary note 14) A program that causes a terminal device including a tilt sensor detecting a tilt to execute: transmitting a signal according to the tilt detected by the tilt sensor; and displaying a status of charging performed according to the tilt detected by the tilt sensor.

(Supplementary note 15) A program that causes a computer serving as a control device to execute: receiving a signal according to a tilt of a terminal device; and controlling charging of a charge target from a power supply, the controlling the charging including switching execution and stop of control of the charging of the charge target from the power supply, based on the received signal according to the tilt of the terminal device.

What is claimed is:

1. A charge and discharge control system comprising a control device and a terminal device,
    the terminal device comprising:
        a tilt sensor that detects a tilt;
        a communication unit that transmits a signal according to the tilt detected by the tilt sensor; and
        a display unit that displays a status of charging performed according to the tilt detected by the tilt sensor, and
    the control device comprising:
        a receiver that receives the signal according to the tilt of the terminal device; and
        a charge and discharge controller that generates a control signal based on the signal according to the tilt of the terminal device received by the receiver, the control signal instructing beginning of electric power supply from a power supply to a charge target, the charge and discharge controller transmitting the generated control signal to the power supply and the charge target, the charge and discharge controller determining whether the tilt sensor has detected that a display screen of the display unit has been brought to a horizontal state, the charge and discharge controller transmitting, to the power supply and the charge target, a signal for maintaining a status of the electric power supply in a case where the charge and discharge controller has determined that the tilt sensor has detected that the display screen of the display unit has been brought to the horizontal state.

2. The charge and discharge control system according to claim 1, wherein
    the communication unit transmits a charge execution request as the signal according to the tilt detected by the tilt sensor when the tilt sensor detects a tilt being made in a direction of rotating the display screen of the display unit along the display screen of the display unit, and
    the charge and discharge controller generates the control signal based on the charge execution request.

3. The charge and discharge control system according to claim 1, wherein the signal for maintaining the status of the electric power supply includes signal for maintaining a charging speed, the charge target being charged at the charge speed.

* * * * *